US008781958B2

(12) United States Patent
Michael

(10) Patent No.: US 8,781,958 B2
(45) Date of Patent: Jul. 15, 2014

(54) SYSTEMS AND METHODS FOR MONITORING, MANAGING, AND FACILITATING TRANSACTIONS INVOLVING VEHICLES

(76) Inventor: Joseph Michael, Los Angeles, CA (US)

( * ) Notice: Subject to any disclaimer, the term of this patent is extended or adjusted under 35 U.S.C. 154(b) by 104 days.

(21) Appl. No.: 13/405,288

(22) Filed: Feb. 25, 2012

(65) Prior Publication Data

US 2012/0323772 A1 Dec. 20, 2012

Related U.S. Application Data

(63) Continuation of application No. 13/192,449, filed on Jul. 27, 2011, and a continuation-in-part of application No. 13/161,483, filed on Jun. 15, 2011, now abandoned.

(51) Int. Cl.
*G06Q 40/00* (2012.01)
(52) U.S. Cl.
USPC ............................................................ 705/39
(58) Field of Classification Search
USPC ............................................................ 705/39
See application file for complete search history.

(56) References Cited

U.S. PATENT DOCUMENTS

| | | | |
|---|---|---|---|
| 5,490,079 A | 2/1996 | Sharpe et al. | |
| 6,246,954 B1 | 6/2001 | Berstis et al. | |
| 6,408,248 B1 | 6/2002 | Yancey, Jr. et al. | |
| 6,765,499 B2 * | 7/2004 | Flick .............................. | 340/989 |
| 7,027,773 B1 | 4/2006 | McMillin | |
| 7,054,832 B1 | 5/2006 | Vallabh | |
| 7,151,998 B2 | 12/2006 | Tajima | |
| 7,532,963 B1 | 5/2009 | Lowrey et al. | |
| 7,640,185 B1 | 12/2009 | Giordano et al. | |
| 7,653,394 B2 | 1/2010 | McMillin | |
| 7,734,500 B1 | 6/2010 | Allen et al. | |
| 8,065,181 B2 | 11/2011 | McNew et al. | |
| 8,478,603 B2 * | 7/2013 | Boss et al. ..................... | 705/1.1 |
| 2001/0050922 A1 | 12/2001 | Tiernay et al. | |
| 2002/0032506 A1 | 3/2002 | Tokitsu et al. | |
| 2002/0089434 A1 | 7/2002 | Ghazarian | |
| 2002/0140577 A1 | 10/2002 | Kavner | |
| 2003/0132288 A1 | 7/2003 | Fulcher et al. | |
| 2003/0135407 A1 | 7/2003 | Reinhardt et al. | |
| 2003/0186675 A1 | 10/2003 | Davis et al. | |
| 2004/0119609 A1 | 6/2004 | Solomon | |
| 2004/0260470 A1 | 12/2004 | Rast | |
| 2005/0040951 A1 | 2/2005 | Zalewski et al. | |
| 2005/0250440 A1 | 11/2005 | Zhou et al. | |
| 2006/0015394 A1 | 1/2006 | Sorensen | |

(Continued)

OTHER PUBLICATIONS

Paus, Annika, Near Field Communication in Cell Phones, Jul. 24, 2007—http://www.emsec.ruhr-uni-bochum.de/media/crypto/attachments/files/2011/04/near_field_communication_in_cell_phones.pdf.

(Continued)

*Primary Examiner* — Jessica Lemieux
(74) *Attorney, Agent, or Firm* — Sheppard Mullin Richter & Hampton LLP

(57) ABSTRACT

A method for monitoring, managing, and facilitating transactions involving a vehicle includes: accessing information including one or more inputs and/or parameters for a transaction involving a vehicle, at least one of the inputs and/or parameters identifying the vehicle or being associated with or established in association with the vehicle; and facilitating or initiating a process of charging an account depending upon the one or more inputs and/or parameters.

26 Claims, 10 Drawing Sheets

(56) References Cited

U.S. PATENT DOCUMENTS

| | | |
|---|---|---|
| 2006/0106504 A1 | 5/2006 | Carpenter |
| 2006/0109085 A1 | 5/2006 | Tiernay et al. |
| 2006/0238334 A1 | 10/2006 | Mangan et al. |
| 2006/0267799 A1 | 11/2006 | Mendelson |
| 2007/0184818 A1 | 8/2007 | Clough |
| 2008/0041936 A1 | 2/2008 | Vawter |
| 2008/0071611 A1 | 3/2008 | Lovett |
| 2008/0208680 A1* | 8/2008 | Cho ................................ 705/13 |
| 2008/0218383 A1* | 9/2008 | Franklin et al. ............... 340/937 |
| 2009/0024458 A1 | 1/2009 | Palmer |
| 2009/0033498 A1 | 2/2009 | Huomo |
| 2009/0033540 A1 | 2/2009 | Breed et al. |
| 2009/0184164 A1 | 7/2009 | Sparks |
| 2009/0192912 A1 | 7/2009 | Griffin et al. |
| 2009/0256736 A1 | 10/2009 | Orr |
| 2009/0295599 A1 | 12/2009 | Coffee et al. |
| 2009/0299857 A1 | 12/2009 | Brubaker |
| 2010/0036610 A1* | 2/2010 | Urciuoli et al. ............... 701/213 |
| 2010/0057624 A1* | 3/2010 | Hurt et al. ....................... 705/76 |
| 2010/0060484 A1 | 3/2010 | Peeters et al. |
| 2010/0073194 A1 | 3/2010 | Ghazarian |
| 2010/0085213 A1 | 4/2010 | Turnock et al. |
| 2010/0100319 A1 | 4/2010 | Trinko et al. |
| 2010/0106413 A1 | 4/2010 | Mudalige |
| 2010/0127828 A1 | 5/2010 | Connolly et al. |
| 2010/0191675 A1 | 7/2010 | Rosenbaum |
| 2010/0233957 A1 | 9/2010 | Dobosz |
| 2010/0265104 A1 | 10/2010 | Zlojutro |
| 2010/0265325 A1 | 10/2010 | Lo et al. |
| 2010/0271196 A1 | 10/2010 | Schmitt et al. |
| 2010/0293033 A1* | 11/2010 | Hall et al. ....................... 705/10 |
| 2010/0332394 A1 | 12/2010 | Ioli |
| 2011/0068165 A1 | 3/2011 | Dabosville |
| 2011/0102232 A1 | 5/2011 | Orr et al. |
| 2011/0112969 A1 | 5/2011 | Zaid et al. |
| 2011/0215901 A1 | 9/2011 | Van Wiemeersch et al. |
| 2011/0304434 A1 | 12/2011 | Kohli et al. |
| 2011/0320243 A1 | 12/2011 | Khan |
| 2012/0029759 A1 | 2/2012 | Suh et al. |
| 2012/0029764 A1 | 2/2012 | Payne et al. |
| 2012/0036074 A1 | 2/2012 | Weiss et al. |
| 2012/0062395 A1 | 3/2012 | Sonnabend et al. |
| 2012/0284209 A1* | 11/2012 | Duffy et al. ................... 705/418 |

OTHER PUBLICATIONS

U.S. Appl. No. 13/192,449: Office Action, Nov. 16, 2012.
U.S. Appl. No. 13/161,483: Office Action, Jul. 3, 2012.
U.S. Appl. No. 13/400,063: Office Action, Jul. 3, 2012.
U.S. Appl. No. 13/400,061: Office Action, Jul. 5, 2012.
U.S. Appl. No. 13/192,449: Office Action, Aug. 15, 2012.
U.S. Appl. No. 13/461,663: Office Action, Aug. 15, 2012.
International Application No. PCT/US12/42537: International Search Report and Written Opinion of the International Search Authority, Sep. 14, 2012.
U.S. Appl. No. 13/461,632: Office Action, Sep. 21, 2012.
International Application No. PCT/US12/48409: International Search Report and Written Opinion of the International Search Authority, Oct. 16, 2012.
U.S. Appl. No. 13/405,282: Office Action, Oct. 26, 2012.
U.S. Appl. No. 13/161,483: Office Action, Dec. 3, 2012.
U.S. Appl. No. 13/400,061: Office Action, Nov. 27, 2012.
U.S. Appl. No. 13/400,063: Office Action, Nov. 23, 2012.
U.S. Appl. No. 13/192,449: Office Action, Jun. 6, 2013.
U.S. Appl. No. 13/405,282: Office Action, Feb. 14, 2013.
U.S. Appl. No. 13/461,632: Office Action, Mar. 14, 2013.
"Difference Between RFID and NFC", Oct. 15, 2009, http://www.differencebetween.net/technology/difference-between-rfid-and-nfc/.

* cited by examiner

SYSTEMS AND METHODS FOR MONITORING, MANAGING, AND FACILITATING TRANSACTIONS INVOLVING VEHICLES

CROSS-REFERENCE TO RELATED APPLICATIONS

This application is a continuation of U.S. patent application Ser. No. 13/192,449, entitled "Systems and methods for monitoring, managing, and facilitating transactions involving vehicles", filed on Jul. 27, 2011, and a continuation-in-part of U.S. patent application Ser. No. 13/161,483, entitled "Systems and methods for monitoring and managing transportation infrastructure and locations of vehicles therein", filed on Jun. 15, 2011 now abandoned, which are hereby incorporated by reference.

TECHNICAL FIELD

The present invention relates generally to transactions involving vehicles and, in particular, monitoring, managing, and facilitating transactions involving a vehicle in which one or more inputs and/or parameters for a transaction are accessed, obtained, or established utilizing a signal and/or information that identifies or uniquely identifies the vehicle.

BACKGROUND ART

Transportation infrastructures provide many benefits to societies in addition to potentially increasing the efficiency and cost effectiveness of moving large numbers of people, goods, and/or other objects from one location to another. A significant challenge in relation to maintaining and successfully managing transportation infrastructures is how to simultaneously accommodate the sometimes conflicting requirements, goals, interests, or preferences of, for example, rush-hour commuters and law enforcement agencies.

Another key consideration in transportation infrastructure management is safety, for example, attempts are often made to strike an appropriate balance between a desire to effectively enforce traffic laws and a need in some circumstances to allow the vast majority of vehicles to continue moving through infrastructure networks (e.g., roads, highways, checkpoints) without being stopped or with minimal delays.

Inefficiencies in the process of enforcing traffic laws sometimes result in the additional problem of failing to timely notify a driver who is breaking a law that he or she is, in fact, breaking the law and potentially endangering their own life or the lives of others. For example, some cities utilize a highly inefficient system in which cameras are positioned to take a picture of a vehicle's license plate (e.g., as the vehicle traverses an intersection) and, thereafter, mail the owner of the vehicle a picture of their vehicle in a red light violation.

Users and operators of transportation infrastructures, parking facilities, storage facilities, impound facilities, and vehicle transport services could also benefit if certain aspects of transactions involving vehicles and the afore-mentioned infrastructures, facilities, and services were less cumbersome and/or expensive.

Accordingly, it would be useful to be able to provide an apparatus or method for monitoring, managing, and facilitating transactions involving vehicles that addresses one or more of the foregoing considerations, or that provides a benefit such as improved efficiency, costs savings, or better or more informed decision making processes, for example, in relation to use, operation, or management of the afore-mentioned infrastructures, facilities, and services.

SUMMARY OF THE INVENTION

In an example embodiment, an apparatus for monitoring, managing, and facilitating transactions involving a vehicle includes: an electronic device that transmits or generates signals including or in association with vehicle identification information that identifies a vehicle equipped with the device, the signals including or providing, or facilitating or initiating a process of providing access to, one or more inputs and/or parameters for a transaction involving the vehicle.

In an example embodiment, an apparatus for monitoring, managing, and facilitating transactions involving a vehicle includes: one or more electronic devices that facilitate providing information including one or more inputs and/or parameters for a transaction involving a vehicle, at least one of the inputs and/or parameters identifying the vehicle or being associated with or established in association with the vehicle, the one or more electronic devices including at least one device configured to initiate, request, and/or facilitate a transfer or charge from an account in relation to the transaction.

In an example embodiment, a method for monitoring, managing, and facilitating transactions involving a vehicle includes: accessing information including one or more inputs and/or parameters for a transaction involving a vehicle, at least one of the inputs and/or parameters identifying the vehicle or being associated with or established in association with the vehicle; and facilitating or initiating a process of charging an account depending upon the one or more inputs and/or parameters.

In an example embodiment, a method for monitoring, managing, and facilitating transactions involving a vehicle includes: receiving signals generated or transmitted by an electronic device, the signals being generated or transmitted in association with vehicle identification information that identifies a vehicle equipped with the device, the signals including or providing, or facilitating or initiating a process of providing access to, information including one or more inputs and/or parameters for a transaction involving the vehicle; and processing the signals and/or information to identify in association with the vehicle a circumstance that satisfies criteria for facilitating, controlling, or initiating an action or a process involving one or more of providing information, providing a notification, transferring funds, and issuing a ticket, a citation, a bill, an invoice, a warning, or other communication.

DISCLOSURE OF INVENTION

Example embodiments described herein involve methods and technologies for monitoring and managing transportation infrastructure and locations of vehicles therein. For purposes of this disclosure, the term "transportation infrastructure" includes, by way of example, but not of limitation: road and highway networks in addition to parking spaces and facilities associated therewith and/or accessible thereby, including structures (bridges, tunnels, culverts, retaining walls), signage and markings, electrical systems (street lighting and traffic lights), edge treatments (curbs, sidewalks, landscaping) and specialized facilities such as road maintenance depots and rest areas; railways, including structures, terminal facilities (rail yards, train stations), level crossings, signalizing and communications systems; canals and navigable waterways requiring continuous maintenance (dredging, etc.); seaports and lighthouses; airports, including air navigational systems; mass transit systems (commuter rail systems, subways, tramways, trolleys and bus transportation); bicycle paths and pedestrian walkways; and ferries. For purposes of this disclosure, the term "vehicles" includes, by way of example, but not of limitation: motorized vehicles, non-motorized vehicles, road vehicles, all-terrain vehicles, railway vehicles, amphibious vehicles, as well as watercraft, hovercraft, aircraft, spacecraft, and other vehicles and vessels. Example embodiments of the methods and technologies described herein facilitate monitoring and managing transportation infrastructure and locations of vehicles therein. Other example embodiments of the methods and technologies described herein facilitate monitoring and managing locations of vehicles, persons, and/or objects in relation to an area or region of interest or concern, independent of whether the area or region includes, constitutes, facilitates, provides access to, or is a part of a transportation infrastructure.

In an example method, a network (or other communication means) is utilized to provide user interfaces at personal computing devices, or at other devices capable of generating interfaces (e.g., interactive displays), in response to commands received and/or resources accessed via the network.

Figure 1:
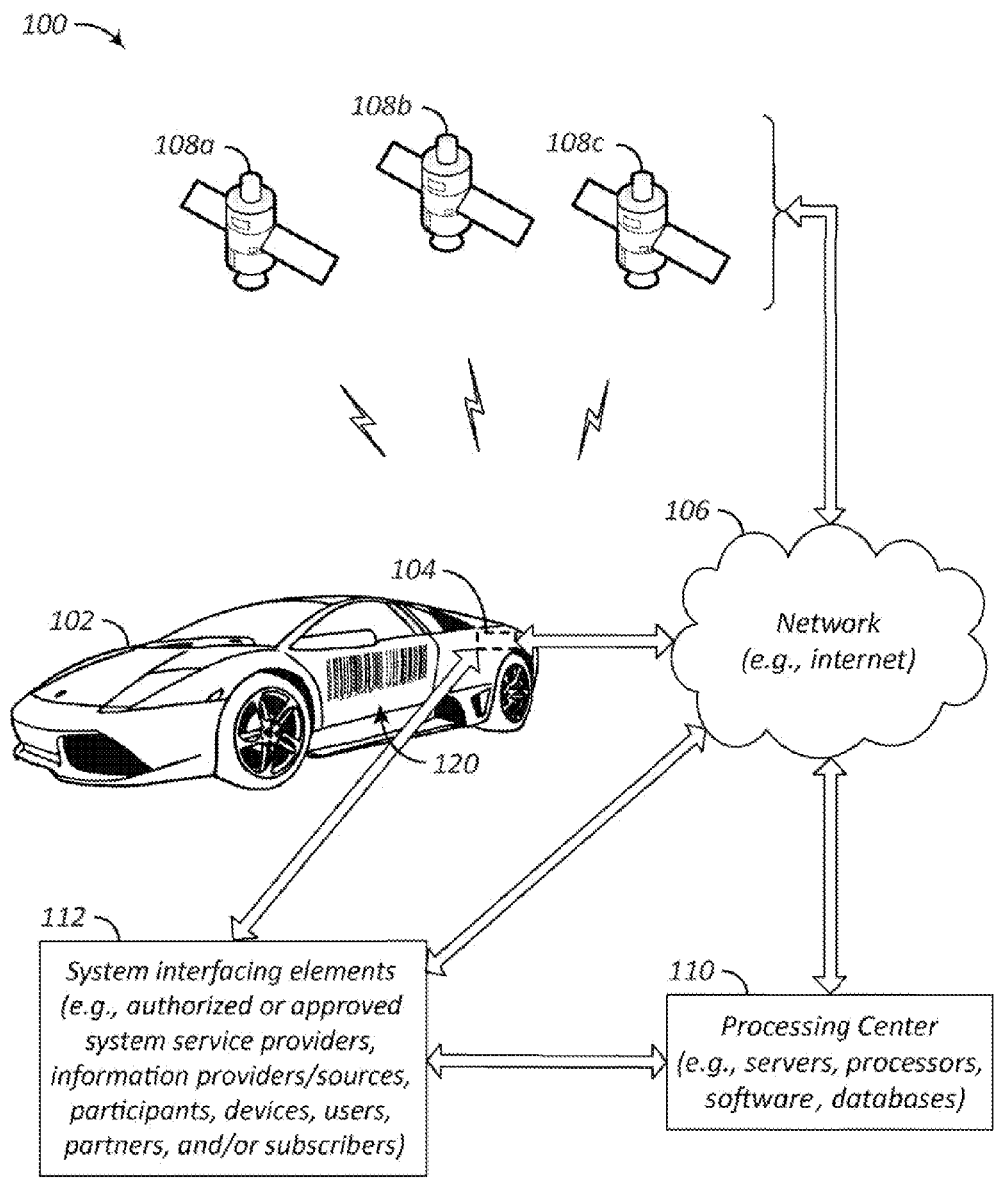
FIG. 1 shows an example implementation of a system for monitoring and managing transportation infrastructure and locations of vehicles therein.

FIG. 1 shows an example implementation of a system 100 for monitoring and managing transportation infrastructure and locations of vehicles therein. In this example implementation, a vehicle 102 is equipped with an electronic tracking device 104 (shown in dashed lines) configured to communicate with a network 106 (e.g., the internet) via satellites 108*a*, 108*b*, and 108*c*. In this example implementation, the network 106 is also utilized to facilitate communications links between a processing center 110 (e.g., implemented in the form of servers, processors, or the like operating under the control of software and/or other sources of commands or inputs), system interfacing elements 112 (e.g., authorized or approved system service providers, information providers/sources, participants, devices, users, partners, and/or subscribers), and the electronic tracking device 104.

For purposes of this disclosure, the term "electronic tracking device" includes, by way of example, but not of limitation: any device attached to a vehicle or other movable thing that reveals its location or movement by transmission of electronic signals. In an example embodiment, the electronic tracking device 104 includes a Global Positioning System (GPS) tracking device or unit (e.g., a GPS module configured to receive GPS signals from the satellites 108*a*, 108*b*, and 108*c* and calculate coordinates) and a modem or other communications device configured to transmit location and telemetry input data.

Figure 2:
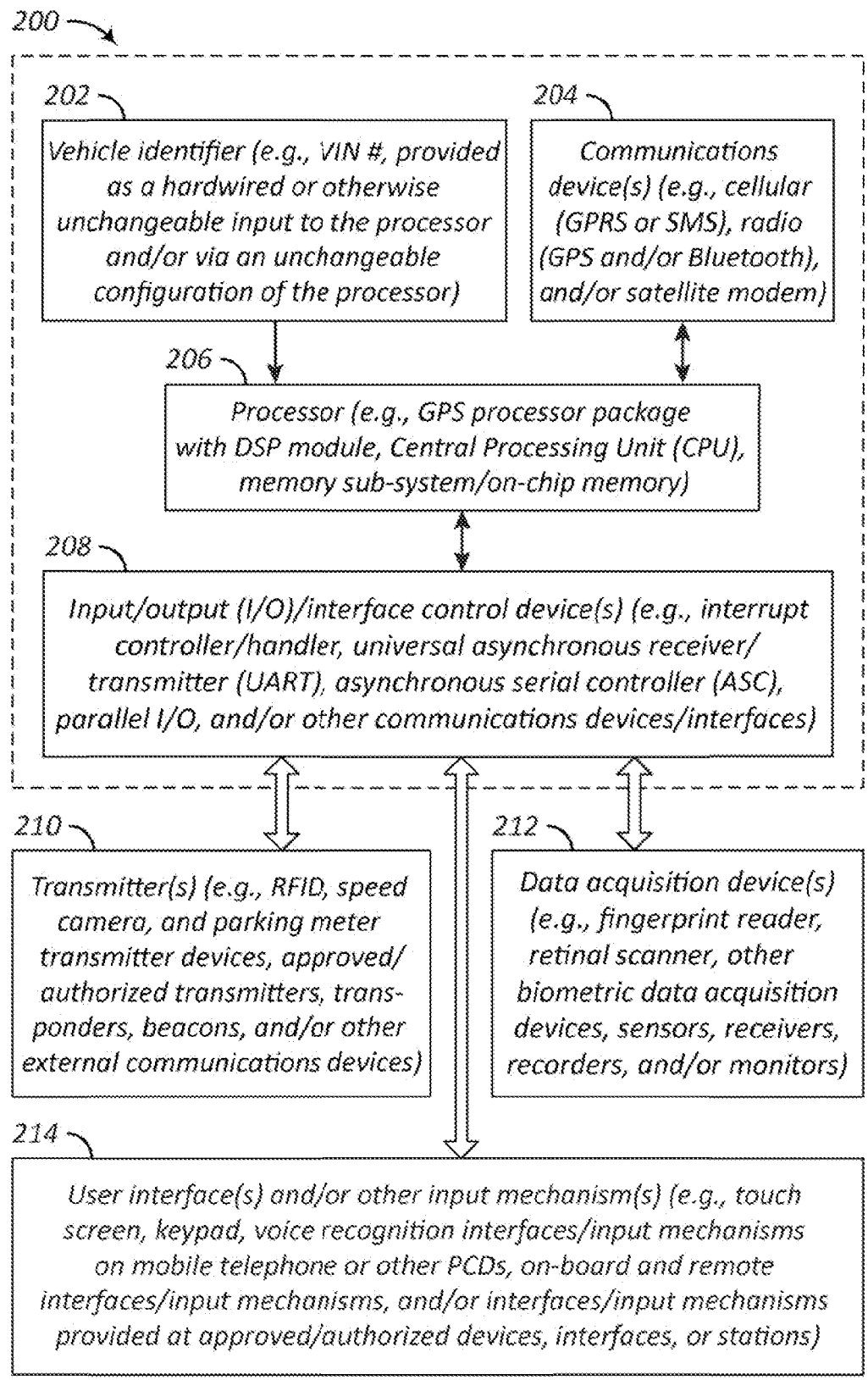
FIG. 2 shows an example electronic tracking device suitable for the system of FIG. 1.

Referring to FIG. 2, an example electronic tracking device 200 (suitable for the system 100 for monitoring and managing transportation infrastructure and locations of vehicles therein) includes a vehicle identifier 202, communications device(s) 204, a processor 206, and input/output (I/O)/interface control device(s) 208 configured as shown. When a vehicle is registered, a license plate is issued. All vehicles are identified with a particular Vehicle Identification Number (VIN) or the Hull Identification Number (HIN) for vessels/boats. Each year the registration establishes the registered owner and also the lienholder. By way of example, the vehicle identifier 202 can be the VIN of the vehicle equipped with the electronic tracking device 200 or other numbers, letters, characters, symbols, codes, or the like, whether human-readable, machine-readable, or both. In an example embodiment, the vehicle identifier 202 includes, represents, and/or provides vehicle identification information that uniquely identifies the vehicle equipped with the electronic tracking device 200. In an example embodiment, the electronic tracking device 200 is configured such that the vehicle identification information cannot be changed or prevented from being transmitted during normal operation of the electronic tracking device. By way of example, the vehicle identifier 202 is implemented/provided as a hardwired or otherwise unchangeable input to the processor 206 and/or via an unchangeable configuration of the processor 206. Moreover, in an example embodiment, the electronic tracking device 200 is configured such that an attempt to change, modify, damage, make unauthorized alterations to, or otherwise tamper with the vehicle identifier 202 and/or processor 206 results in an alert or alarm being generated, e.g., transmitted by the communications device(s) 204 to one or more of, for example: a state, a county, a city, a town, a municipality, a court, a government agency, a law enforcement agency, a department of motor vehicles, a parking and/or traffic enforcement agency, a company or other private-sector entity or organization, authorized operators and users of a system for monitoring and managing transportation infrastructure and locations of vehicles therein, an individual or a group, an owner or a registered owner of the vehicle, a person or persons authorized or approved by the owner and/or the registered owner of the vehicle, a lienholder, an insurance company, an authorized or approved source or device, and a processor or controller.

The communications device(s) 204 include, for example, a cellular (GPRS or SMS), radio (GPS), and/or satellite modem. The communications device(s) 204 can include one or more of, for example: modems, transmitters, transponders, beacons, transceivers, and/or receivers. In an example embodiment, the communications device(s) 204 include a communications device that utilizes a short-range wireless technology or standard (e.g., Bluetooth), or a wireless local area network (WLAN) (e.g., based on the IEEE 802.11 standards). Thus, in example embodiments, the electronic tracking device 200 includes a communications device facilitating one or more of cellular, radio and satellite communications.

The processor 206 includes or is implemented utilizing, for example, a GPS processor package with a digital signal processing (DSP) module (for processing signals received from GPS satellites), a Central Processing Unit (CPU), and a memory sub-system/on-chip memory. By way of example, the DSP module includes GPS correlation hardware configured to extract GPS data from incoming intermediate frequency (IF) data, various implementations of which are known to one of ordinary skill in the art.

The input/output (I/O)/interface control device(s) 208 include one or more of, for example: an interrupt controller/handler, a universal asynchronous receiver/transmitter (UART), an asynchronous serial controller (ASC), a parallel I/O, and other communications devices/interfaces. In example embodiments, the electronic tracking device 200 includes one or more devices that serve as both a communications device 204 and an input/output (I/O)/interface control device 208.

The input/output (I/O)/interface control device(s) 208 receive signals that include data, information, commands, and/or other inputs, as shown in FIG. 2, from one or more of: transmitter(s) 210, data acquisition device(s) 212, and user interface(s) and/or other input mechanism(s) 214. The transmitter(s) 210 include one or more of, for example: a radio-frequency identification (RFID) transmitter/transponder, a camera (e.g., a speed camera, hand-held digital camera) equipped with a transmitter or other communications device, a parking meter transmitter device, and approved/authorized transmitters, transponders, beacons, and other external communications devices (i.e., separate from or remotely located in relation to the electronic tracking device 200). The data acquisition device(s) 212 include one or more of, for example: a fingerprint reader, a retinal scanner, and other biometric data acquisition devices, sensors (e.g., blood alcohol sensor), receivers, recorders, and monitors. The user interface(s) and/or other input mechanism(s) 214 include one or more of, for example: a touch screen, a keypad, voice recognition interfaces/input mechanisms on mobile telephones, smartphones, or other personal computing devices (PCDs), on-board and remote interfaces/input mechanisms, and interfaces/input mechanisms provided at approved/authorized devices, interfaces, or stations. In alternative embodiments, one or more of the transmitter(s) 210, the data acquisition device(s) 212, and the user interface(s) and/or other input mechanism(s) 214 are a component, a part, or a peripheral of the electronic tracking device 200.

In an example embodiment, an apparatus for monitoring and managing transportation infrastructure and locations of vehicles therein includes: an electronic tracking device with a transmitter that generates signals that include information relating to (e.g., identifying) one or more of a vehicle equipped with the electronic tracking device (e.g., VIN or other unique identifier), an owner (e.g., registered owner), a driver, a custodian (e.g., renter), or a passenger of the vehicle, a person, an animal, or an object within, secured to, or transported by the vehicle, and a person, an entity, an object, a status, a condition, an event, an indication, or an interrupt associated with the vehicle. In an example embodiment, the signals are transmitted over an interval of time (e.g., during which the vehicle changes its location in relation to one or more devices that receive the signals).

In example embodiments, one or more of the communications device(s) 204 is configured to transmit the signals to one or more participatory elements of a monitoring system (e.g., a system for monitoring and managing transportation infrastructure and locations of vehicles therein). For example, and referring to FIG. 1, the communications device 204 is included as a part, a component, or a peripheral of the electronic tracking device 104 and is configured to transmit the signals, either directly or indirectly (e.g., via the network 106 or the satellites 108a, 108b, and 108c), to the processing center 110 and/or one or more of the system interfacing elements 112. In example embodiments, the processing center 110 and/or other participatory elements of a monitoring system receive or are provided with the signals and/or information (e.g., signals and/or information received over an interval of time). In example embodiments, the processing center 110 and/or other participatory elements of a monitoring system store the signals and/or information, utilize the signals and/or information to update one or more databases, and/or process the signals and/or information.

Referring again to FIG. 2, in an example embodiment, the electronic tracking device 200 is configured to receive and respond to interrupts and/or commands from one or more of: authorized or approved sources and/or devices (e.g., law enforcement agencies, police and other authorized transmitter devices, blood alcohol sensors, one or more departments of motor vehicles, parking and/or traffic enforcement agencies, operators and users of a system for monitoring and managing transportation infrastructure and locations of vehicles therein, a person or an entity authorized or approved to receive or collect funds, an owner or a registered owner of the vehicle, a person or persons authorized or approved by the owner and/or the registered owner of the vehicle, lienholders, insurance companies, a processor or controller of or in communication with the electronic tracking device 200), biometric data acquisition devices, user-input mechanisms (e.g., on-board touch screen, mobile telephone, smartphone, or personal communication device (PCD) of the registered owner of the vehicle, emergency call devices), RFID transmitters, speed camera transmitters, and parking meters.

In example embodiments, and referring also to FIG. 1, one or more of the transmitter(s) 210, the data acquisition device(s) 212, and the user interface(s) and/or other input mechanism(s) 214 are included among the system interfacing elements 112 (FIG. 1). For example, the system interfacing elements 112 can include a speed camera or other image capture device configured to read a code 120 (e.g., a bar code) provided on the vehicle 102 and to utilize information or data obtained from reading the code 120 to generate (or facilitate the generation of) an interrupt and/or command. In an example embodiment, the information or data is obtained (directly) by reading the code 120. In another example embodiment, the information or data used by a system interfacing element 112 to determine if an interrupt and/or command should be generated is provided at least in part by another source (e.g., the processing center 110) or device. For example, the speed camera transmits or causes another device to transmit an interrupt and/or command in response to a determination or information indicating that the vehicle 102 is or was traveling at an unlawful, inappropriate, or excessive speed. In this example, a speed camera transmitter can uplink the interrupt and/or command (e.g., to the processing center 110) or directly transmit the interrupt and/or command (e.g., to a receiver or other communications device of the electronic tracking device 200). In example embodiments, a speed camera (or other transmitter-equipped system interfacing element 112) can also transmit an interrupt and/or command, as well as other information or data, either directly or indirectly, to other participatory elements of a monitoring system.

The code 120 can be provided in the form of numbers, letters, characters, symbols, and/or other indicia, whether visible or otherwise (e.g., code that is not revealed by visible light, but rather by infrared). The code 120 can be human-readable, machine-readable, or both. In example embodiments, the code 120 is provided on the vehicle 102 in the form of a material such as paint (e.g., in conjunction with applying paint to the vehicle during its manufacture) that is readable by a speed camera or other image capture device independent of whether the electronic tracking device 104 is present or operational. Thus, the code 120 can serve as an alternative or supplemental means for providing vehicle identification information, i.e., means that can be utilized when the electronic tracking device 200 malfunctions or ceases normal operation (i.e., transmitting the signals), or if the vehicle has not been provided with an electronic tracking device, or if the electronic tracking device has been removed from the vehicle.

In example embodiments, the interrupts and/or commands facilitate, control, or initiate (e.g., in response to commands or instructions executed by the processor 206 and/or by a processor/controller accessible to and/or in communication with the electronic tracking device 200) one or more of, for example: modifying the information transmitted or adding additional information to the signals transmitted by the electronic tracking device; providing information and/or notifications to authorized operators and users of a system for monitoring and managing transportation infrastructure and locations of vehicles therein; controlling an interactive user interface, a graphical user interface, or a display inside the vehicle, on a mobile communications device (e.g., a mobile telephone, a smartphone, or other PCD configured to facilitate wireless communications), and/or at a remote location to provide one or more of information, instructions, a notification, a warning, and a prompt; transferring funds from an account associated with one or more of the vehicle, an owner, a driver, a custodian, or a passenger of the vehicle, a person, an animal, an object within, secured to, or transported by the vehicle, and a person, an entity, an object, a status, a condition, an event, an indication, or an interrupt associated with the vehicle to one or more other accounts; and issuing a ticket, citation, warning or other communication. It should be understood that the personal computing devices described herein are presented as examples of devices capable of generating interfaces (e.g., interactive displays) in response to commands received and/or resources accessed via a network (or other communication means) and that the scope of the invention(s) includes implementations in which other devices are alternatively or additionally utilized to provide interfaces in relation to or otherwise implement the technologies and/or methodologies described herein.

The process of modifying the information transmitted or adding additional information to the signals transmitted by the electronic tracking device includes, by way of example, changing information associated with the vehicle or a status of a person or object associated with the vehicle, or adding biometric information (e.g., biometric information identifying in association with the vehicle an unauthorized driver of the vehicle or a wanted criminal), RFID information (e.g., RFID information received by the electronic tracking device 200 identifying stolen goods on board the vehicle), or emergency call information (e.g., information constituting an emergency call or a call for help received from an approved/authorized transmitter, beacon, or the like) to the signals. In an example embodiment, the electronic tracking device 200 includes or is operatively coupled or connected to a data acquisition device 212 (e.g., a fingerprint reader, retinal scanner, or blood alcohol sensor), which can be configured to require an input from the driver (e.g., as a prerequisite to enabling operation of the vehicle), as well as an input from some or all of the passengers (e.g., associating inputs provided at one or more data acquisition device(s) 212 with particular seats in the vehicle). Detection of a passenger who has not provided an input via a data acquisition device 212 can be accomplished utilizing weight sensors in the seats to provide this additional input to the electronic tracking device 200.

The process of providing information and/or notifications to authorized operators and users of a system for monitoring and managing transportation infrastructure and locations of vehicles therein includes, by way of example, providing information and/or notifications relating to vehicle registration (e.g., information about a vehicle registration process, a notification of a registration renewal deadline, a notification to a law enforcement agency that a vehicle registered to a felon or some other category or type of criminal has been identified within a particular area or region), a driver's license (e.g., a notification of a deadline for renewing a driver's license), an insurance policy (e.g., a notification of a deadline for renewing an automobile insurance policy), and/or a location (e.g., a tracked location) of a stolen vehicle (thereby assisting law enforcement agencies in tracking stolen vehicles and reducing the overall cost to insurance companies and the overall insurance rate to the general public.) The authorized operators and users include one or more of, for example: a law enforcement agency, a government agency (e.g., one or more departments of motor vehicles), a state, a county, a city, a town, or a municipality, a company or other private-sector entity or organization (e.g., a lienholder, an insurance company), an individual or a group (e.g., security guards/personnel, private investigators, deputized individuals, groups of citizens) provided with an authorized or approved device (e.g., proprietary equipment), an owner or a registered owner of the vehicle, and a person authorized or approved by the owner and/or the registered owner (e.g., family members, employees).

The process of controlling an interactive user interface, a graphical user interface, or a display inside the vehicle, on a mobile communications device, and/or at a remote location to provide one or more of information, instructions, a notification, a warning, and a prompt includes, by way of example, controlling an interactive user interface, a graphical user interface, or a display to provide information to a driver that his or her vehicle is approaching a checkpoint, an accident, or a potential hazard. For example, the interface or display is controlled to provide the information on a map (e.g., updated utilizing GPS data) that includes visual representations of, or icons representing, police, DUI, and/or other checkpoints in an area or region that the vehicle is moving through. In another example embodiment, the interface or display is controlled to provide information to a government agency (e.g., United States Secret Service), a law enforcement agency (e.g., state or city police), and/or a security organization (e.g., private security personnel) that a vehicle (e.g., registered to a felon, criminal, or other person or entity of interest or concern) has been identified or information relating to a detected or reported location and/or movement of the vehicle. For example, the interface or display is controlled to provide the information on a map (or other representation of an area or region) that includes visual representations of, or icons representing, detected vehicles and/or information associated with each of the vehicles (e.g., information downloaded from a database maintained at the processing center 110).

In another example embodiment, the interface or display (e.g., generated inside the vehicle and/or on a mobile communications device associated with the owner or registered owner of the vehicle) is controlled to provide a notification relating to registration of the vehicle, e.g., a message notifying a person who has been in California for 20 days that they need to register their vehicle if they now reside in California. Information as to whether a person has accepted gainful employment in California, claimed a homeowner's exemption in California, has rented or leased a residence in California, has acquired a California driver's license or registered to vote, enrolled in an institute of higher learning as a California resident, or enrolled their dependents in school (K-12) can also be taken into consideration in controlling the interface or display. For example, nonresident military personnel stationed in California and their spouses may operate their vehicles with valid out-of-state license plates from their home state of the state where the military person was last stationed. In example embodiments, one or more departments of motor vehicles (DMVs) are participants in a monitoring system that shares and/or aggregates information as between the DMV(s) and other authorized or approved participants (e.g., lienholders). Technically, a lienholder is the co-owner of a vehicle. If the registered owner fails to pay the lienholder, the location of the vehicle can be established in assisting the lienholder repossess the vehicle. This will reduce the cost of repossession to many financial institutions. To this end, in another example embodiment, the interface or display (e.g., generated at a remote location in relation to the vehicle) is controlled to provide a notification (e.g., to a lienholder) pertaining to one or more of, for example: names and addresses of the registered owner of the vehicle, the legal owner of the vehicle, and interested parties in relation to the vehicle (e.g., from DMV vehicle history records, which are incorporated into one or more databases maintained and managed, for example, by one or more monitoring system participants).

In another example embodiment, the interface or display (e.g., generated inside the vehicle and/or on a mobile communications device associated with the owner or registered owner of the vehicle) is controlled to provide a warning relating to a location and/or movement of the vehicle. For example, the interface or display (and, optionally, also a speaker or other sound generating device) is controlled to provide a visual representation of the warning (e.g., a text message, such as: "You are traveling at an excessive speed. This is a courtesy warning. Next time, you will receive a citation and fine, and possibly additional penalties, impounding of your vehicle, and/or suspension or revocation of your driver's license as may be appropriate or required under the law.")

In another example embodiment, the interface or display (e.g., generated inside the vehicle, on a mobile communications device associated with the owner or registered owner of the vehicle, and/or at a remote location in relation to the vehicle) is controlled to provide a prompt relating to the vehicle. For example, the interface or display (and, optionally, also a speaker or other sound generating device) is controlled to provide a visual representation of the prompt (e.g., a user interface presenting a message field or other visual representation of a prompt to renew and/or authorize a transfer of funds for renewal of a vehicle registration, a driver's license, and/or automobile insurance).

The process of transferring funds from an account associated with one or more of the vehicle, an owner, a driver, a custodian, or a passenger of the vehicle, a person, an animal, an object within, secured to, or transported by the vehicle, and a person, an entity, an object, a status, a condition, an event, an indication, or an interrupt associated with the vehicle to one or more other accounts includes, by way of example, transferring funds from an account associated with a renter of the vehicle (e.g., if a moving violation involving the vehicle is detected or determined to have occurred while the renter was driving the vehicle) or a passenger of the vehicle identified from biometric data (e.g., an obligor parent in child support arrears identified, for example, by checking identified passengers or other persons in the vehicle to determine if they are included in a "deadbeat parents" database), or transferring funds from the account to one or more accounts associated with multiple departments of motor vehicles (e.g., revenue splitting between California and Michigan DMVs). The one or more other accounts are associated with one or more of, for example: an entity authorized to receive or collect funds in relation to a parking or moving violation associated with the vehicle, a government agency (e.g., a DMV), a state, a county, a city, a town, a municipality, a court, a lienholder, and an insurance company.

The process of issuing a ticket, citation, warning or other communication includes, by way of example, issuing a ticket, citation, warning or other communication in relation to a parking or moving violation associated with the vehicle). For example, the VIN of the vehicle is transmitted with a computer or processor generates the citation for a particular violation associated with the vehicle. In the case of speeding violations, vehicle speed can be determined using GPS data only, radar reports of the speed of the vehicle associated with a particular VIN, or utilizing GPS data in conjunction with radar speed measurements.

The technologies and methods described herein can be implemented, by way of example, utilizing one or more websites, user interfaces, and/or applications. In an example embodiment, referring again to FIG. 1, the processing center 110 can perform the functions of, provide, or facilitate a service host (e.g., implemented in the form of servers, processors, or the like operating under the control of software and/or other sources of commands or inputs) configured, for example, to utilize a system application or other platform to facilitate vehicle associated monitoring and/or other activities or tasks, for example, by hosting a website accessible by system participants and/or users via the network 106.

In example embodiments, technologies and methods for monitoring and managing transportation infrastructure and locations of vehicles therein are implemented via a website (and/or one or more other resources accessible via a network or otherwise).

In example embodiments, technologies and methods for improving a vehicle registration process are implemented as an addition and/or an improvement to an existing website such as the official website of California Department of Motor Vehicles (dmv.ca.gov), The Los Angeles Police Department (www.lapdonline.org), or The Federal Bureau of Investigation (www.fbi.gov). In an example embodiment, one or more interfaces are generated utilizing a custom plug-in system application which functions as an extension and overlay to an existing system application or other platform that facilitates, for example, on-line vehicle registration renewal and/or driver's license renewal. It should be understood that the user interfaces described herein can be implemented or provided utilizing a website, an addition and/or an improvement to an existing website, or a resource other than a website, and independent of whether the resource is directly accessible by the user. Furthermore, resources can be distributed with respect to their physical locations and can be controlled, individually or as groups (e.g., shared resources), by one or more service hosts and/or system participants.

In an example "Vehicle Digital Registration" technology and/or methodology, each manufacturer of a motor vehicle is required, encouraged, and/or incentivized to install an electronic tracking device or other transmission device that communicates (e.g., continually transmits) information including vehicle identification information (e.g., the VIN of the vehicle) to a satellite and/or a sensor which establish the VIN of a vehicle to a satellite. For example, a DMV or other government agency can make the installation of a transmitter/sensor a requirement (e.g., a required step in the vehicle registration process) and mandatory in new vehicles as well as used vehicles.

Figure 3:
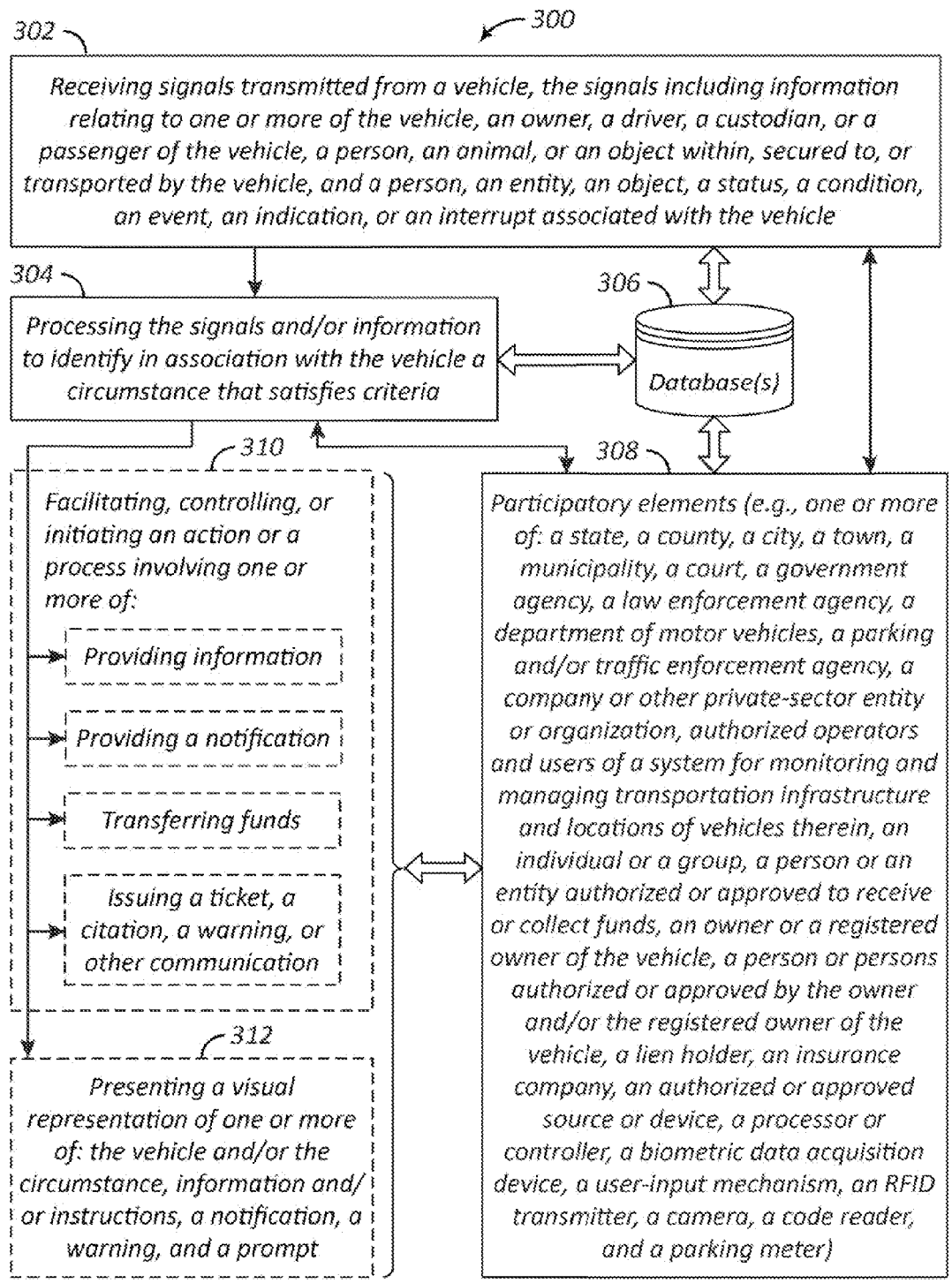
FIG. 3 shows an example implementation of a method for monitoring and managing transportation infrastructure and locations of vehicles therein.

FIG. 3 shows an example implementation of a method 300 for monitoring and managing transportation infrastructure and locations of vehicles therein. At 302, signals transmitted from a vehicle are received (e.g., and referring also to FIG. 1, by one or more of the network 106, the satellites 108a, 108b, and 108c, the processing center 110, and the system interfacing elements 112). The signals include information relating to (e.g., identifying) one or more of, for example: the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle. In an example embodiment, the signals are received over an interval of time.

At 304, the signals and/or information are processed to identify in association with the vehicle a circumstance that satisfies (predetermined or other) criteria. The signals and/or information are processed, for example, by the processing center 110 and/or one or more of the system interfacing elements 112 (e.g., operators, users, and/or devices involved in or facilitating a system for monitoring and managing transportation infrastructure and locations of vehicles therein). In example embodiments, the signals and/or information are processed at least in part by participatory elements 308. By way of example, the participatory elements 308 include one or more of: a state, a county, a city, a town, a municipality, a court, a government agency, a law enforcement agency, a department of motor vehicles, a parking and/or traffic enforcement agency, a company or other private-sector entity or organization, authorized operators and users of a system for monitoring and managing transportation infrastructure and locations of vehicles therein, an individual or a group, a person or an entity authorized or approved to receive or collect funds, an owner or a registered owner of the vehicle, a person or persons authorized or approved by the owner and/or the registered owner of the vehicle, a lienholder, an insurance company, an authorized or approved source or device, a processor or controller, a biometric data acquisition device, a user-input mechanism, an RFID transmitter, a camera, a code reader, and a parking meter. In example embodiments, information, data, and/or programs stored in one or more database(s) 306 is utilized in processing the signals and/or information. The database(s) 306 include one or more of, for example, a law enforcement database, a DMV database, an insurance database, and a lienholder database. It should be understood that the database(s) 306 can include additional database(s) pertaining, for example, to other types of information and/or data as described herein.

In an example embodiment, the circumstance is an identification, a determination, and/or a prediction of one or more of a parking violation and a moving violation associated with one or more of the vehicle, an owner, a driver, a custodian, or a passenger of the vehicle, and a person within or transported by the vehicle.

In another example embodiment, the circumstance is an identification, a determination, and/or a prediction that one or more of a registration, a driver's license, and an insurance policy associated with one or more of the vehicle, an owner, a driver, a custodian, or a passenger of the vehicle, and a person within or transported by the vehicle is, or will be, expired, out-of-state, canceled, revoked, and/or suspended.

In another example embodiment, the circumstance is an identification, a determination, and/or a prediction that one or more of an account, a tax, an assessment, a charge, a surcharge, a fee, a fine, and a penalty associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle is, or will be, late, overdue, unpaid, delinquent, and/or in default (e.g., a deadbeat parent passenger of the vehicle who is late in paying child support; valuables, such as jewelry tracked with RFID-based technology, that were purchased pursuant to an installment payment plan now in default).

In another example embodiment, the circumstance is a crime, reported, detected or suspected criminal activity, or an identification, a determination, and/or a prediction of a crime or criminal activity associated with one or more of the vehicle, an owner, a driver, a custodian, or a passenger of the vehicle, a person, an animal, or an object within, secured to, or transported by the vehicle, and a person (e.g., human trafficking/smuggling), an entity, an object (e.g., stolen goods), a status, a condition, an event, an indication, or an interrupt associated with the vehicle.

In another example embodiment, the circumstance is an identification, a determination, and/or a prediction of a status associated with one or more of the vehicle (e.g., stolen), an owner, a driver, a custodian, or a passenger of the vehicle, a person, an animal, or an object within, secured to, or transported by the vehicle, and a person (e.g., felon, parolee, registered sex offender, child molester), an entity, an object, a condition, an event, an indication, or an interrupt associated with the vehicle.

In another example embodiment, the circumstance is an identification, a determination, and/or a prediction of one or more of a condition (e.g., illegal, non-exempted, excessive or increasing levels of emissions, or greenhouse gases, that are being generated by the vehicle; intoxication/impairment of the driver of the vehicle), an indication (e.g., vehicle transmitter malfunctioning, attempt was made to disable), and an interrupt associated with one or more of the vehicle, an owner, a driver, a custodian, or a passenger of the vehicle, a person, an animal, or an object within, secured to, or transported by the vehicle, a person, an entity, an object, a status, or an event associated with the vehicle, and a location, an area, a region, or an environment within which the vehicle is located, or that the vehicle is approaching or departing from. Examples of interrupts include: an alert (e.g., child abduction/Amber Alert, hazardous materials alert/Hazmat alert), an emergency call (e.g., SOS, 911, body function/vital signs monitor automatically generating emergency call, for example, in response to cardiac arrest), an alarm (e.g., silent alarm triggered by an undercover peace officer inside the vehicle).

In another example embodiment, the circumstance is an event (e.g., a presidential motorcade) for or during which a location of the vehicle or a person, an animal, or an object within, secured to, or transported by the vehicle presents or potentially raises a concern in relation to the event.

In another example embodiment, the circumstance is an identification, a determination, and/or a prediction that a location (e.g., a tracked location) of the vehicle is within, approaching, or departing from an area, a region, or an environment designated as prohibited, unlicensed, limited, restricted, or cautionary access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle.

In another example embodiment, the circumstance is an identification, a determination, and/or a prediction that a location (e.g., a tracked location) of the vehicle is outside, departing from, or returning to an area, a region, or an environment designated as allowed, permitted, licensed, unlimited, unrestricted, or safe access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle.

At 310, an action or a process is facilitated, controlled, or initiated (e.g., by one or more of the participatory elements 308). The action or process involves one or more of, for example: providing information, providing a notification, transferring funds, and issuing a ticket, citation, warning or other communication. In an example embodiment, a method for monitoring and managing transportation infrastructure and locations of vehicles therein includes processing the signals and/or the information to identify in association with the vehicle a circumstance that satisfies criteria for facilitating, controlling, or initiating an action or a process involving one or more of providing information, providing a notification, transferring funds, and issuing a ticket, a citation, a warning, or other communication.

An action or a process involving providing information includes, by way of example, providing information pertaining to one or more of the vehicle, an owner, a driver, a custodian, or a passenger of the vehicle, a person, an animal, or an object within, secured to, or transported by the vehicle, a person, an entity, an object, a status, a condition, an event, an indication, or an interrupt associated with the vehicle, the circumstance, and a location, an area, a region, or an environment within which the vehicle is located, or that the vehicle is approaching or departing from, to one of more of, for example: a law enforcement agency, a government agency, a state, a county, a city, a town, or a municipality, a company or other private-sector entity or organization, an individual or a group provided with an authorized or approved device, an owner or a registered owner of the vehicle, and a person authorized or approved by the owner and/or the registered owner.

With respect to an action or a process involving providing a notification, the notification pertains to one or more of, for example: a parking violation and/or a moving violation associated with one or more of the vehicle, an owner, a driver, a custodian, or a passenger of the vehicle, and a person within or transported by the vehicle; a crime, criminal activity, illegal action, prohibited substance, criminal record or notice and/or conviction associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle; a location and/or a movement of the vehicle; locations and/or movements of one or more vehicles associated with a person, persons, entity, object, group, organization, event, enterprise, and/or circumstance; an event for or during which a location of the vehicle or a person, an animal, or an object within, secured to, or transported by the vehicle presents or potentially raises a concern in relation to the event; an area, a region, or an environment designated as prohibited, unlicensed, limited, restricted, or cautionary access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle; an area, a region, or an environment designated as allowed, permitted, licensed, unlimited, unrestricted, or safe access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle; a registration, a driver's license, and/or an insurance policy associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle; vehicle registration requirements for new residents of the state; and information and/or updates to information in a DMV or other database.

An action or a process involving transferring funds includes, by way of example, transferring funds from an account associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle to one or more other accounts (e.g., revenue splitting between California and Michigan DMVs). By way of example, the one or more other accounts are associated with one or more of: an entity authorized to receive or collect funds in relation to a parking or moving violation associated with the vehicle, a state agency (e.g., a DMV), a city, a municipality, a court, a lienholder, and an insurance company.

With respect to an action or a process involving issuing a ticket, a citation, a warning, or other communication, in an example embodiment, the ticket, citation, warning, or other communication is electronically issued and/or automatically transmitted (e.g., to the person ticketed/cited/warned and/or to other interested, appropriate, or designated recipients such as, for example, a parole officer, a parent/guardian, or a superior officer). In an example embodiment, a ticket, a citation, a warning, or other communication in relation to a parking or moving violation associated with the vehicle is automatically generated and electronically transmitted (e.g., at a time deemed appropriate depending upon the nature and/or circumstances of the violation).

In an example embodiment, a citation is automatically generated and transmitted (e.g., when it is detected or otherwise determined that a vehicle is using public roads with an expired registration). To this end, the database(s) 306 can also include or facilitate access to information indicating whether a road is public or private. Thus, example methodologies and technologies described herein embody and/or provide an "Automatic Citation Tool" that can be utilized by law enforcement agencies or others to track and/or find vehicles that travel on roadways and/or use public streets with expired registrations or registrations soon to expire or in a renewal grace period. The "Automatic Citation Tool" described herein compares favorably, at least in terms of efficiency, to the traditional process of a parking enforcement officer or law officer visually inspecting the license tag of a license plate in order to identify vehicles that are using the public roadways with expired registrations.

In another example embodiment, an account, person, or entity associated with a vehicle is automatically billed when it is detected or otherwise determined that the vehicle is not properly registered. For example, a bill is automatically generated after a vehicle from another state (or country) has been within the border of a state for a period of time (e.g., a minimum number of days) triggering a requirement of vehicle registration in that state. Thus, example methodologies and technologies described herein embody and/or provide an "Automatic Registration Billing Tool" that can be utilized by a DMV to help increase the amount of vehicle registration revenues received and the speed with which they are received. Moreover, the "Automatic Registration Billing Tool" described herein stands to dissuade the pervasive practice—often perpetrated by the owners of expensive vehicles—of purchasing vehicles in another state, which may have lower or no vehicle registration fees, but using the vehicle primarily in some other state (e.g., purchasing and registering a vehicle in Nevada, while garaging and using the vehicle in California). In another embodiment, an "Automatic Registration Billing Tool" automatically determines (e.g., based on monitored locations of the vehicle) circumstances when a prorated, shared, or other distribution of vehicle registration fees (or other vehicle-related fees or revenues) is warranted as between multiple states or other jurisdictions.

Example methodologies and technologies described herein present, or facilitate a presentation of, visual representations pertaining to a vehicle, a circumstance, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle, information, and/or notifications. Example implementations utilize a network and/or communications links and one or more interfaces and/or displays are to present the visual representations.

At 312, a visual representation is presented (e.g., to one or more of the participatory elements 308). By way of example, the visual representation presented is a visual representation of one or more of: the vehicle and/or the circumstance, information and/or instructions, a notification, a warning, and a prompt. In an example embodiment, a method for monitoring and managing transportation infrastructure and locations of vehicles therein includes presenting a visual representation of one or more of: the vehicle and/or the circumstance, information and/or instructions, a notification, a warning, and a prompt.

Figure 4:
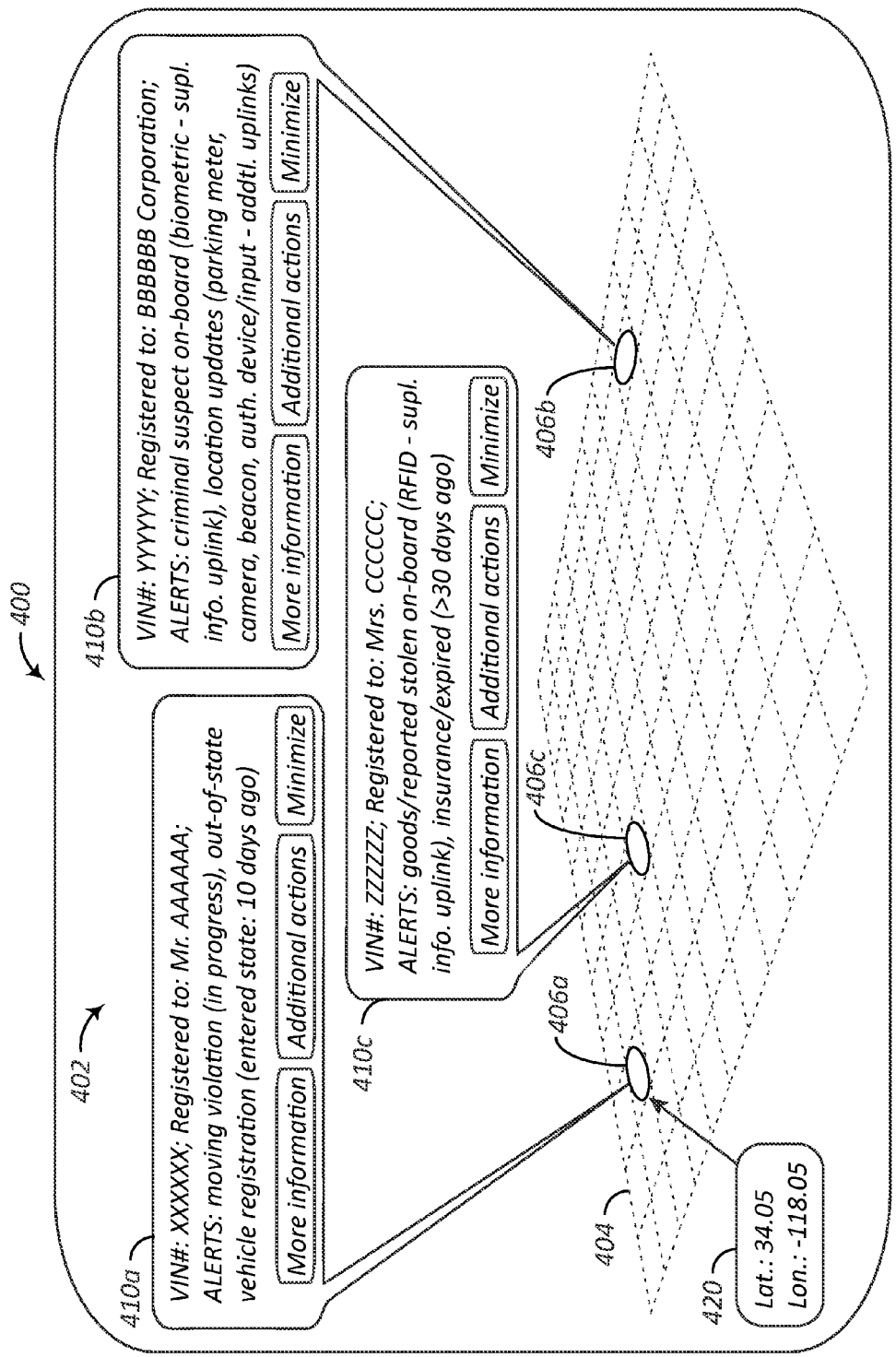
FIG. 4 shows an example interactive interface presenting a visual representation of a region, vehicles within the region, and information associated with the vehicles.

FIG. 4 shows an example interactive interface 400 presenting a visual representation 402 of a region 404, vehicles 406a, 406b, and 406c within the region, and information associated with the vehicles. In this example, interface portions 410a, 410b, and 410c (of the interface 400) are controlled to provide information associated with the vehicles 406a, 406b, and 406c, respectively. Within each of the interface portions 410a, 410b, and 410c, sub-portions denoted "More information", "Additional actions", and "Minimize" are actuated, for example, by touching a location of the interface 400 bound by one of the sub-portions. For example, in response to selections and/or inputs provided at a menu or interface facilitating "Additional actions", a display portion 420 is generated to present latitude and longitude information for a particular vehicle. In this example, the interface portion 410a provides the following information about and/or associated with the vehicle 406a: "VIN#: XXXXXX; Registered to: Mr. AAAAAA. ALERTS: moving violation (in progress), out-of-state vehicle registration (entered state: 10 days ago)". In this example, the interface portion 410b provides the following information about and/or associated with the vehicle 406b: "VIN#: YYYYYY; Registered to: BBBBBB Corporation; ALERTS: criminal suspect on-board (biometric—supl. info. uplink), location updates (parking meter, camera, beacon, auth. device/input—addtl. uplinks)". In this example, the interface portion 410c provides the following information about and/or associated with the vehicle 406c: "VIN#: ZZZZZZ; Registered to: Mrs. CCCCCC; ALERTS: goods/reported stolen on-board (RFID—supl. info. uplink), insurance/expired (>30 days ago)".

Figure 5:
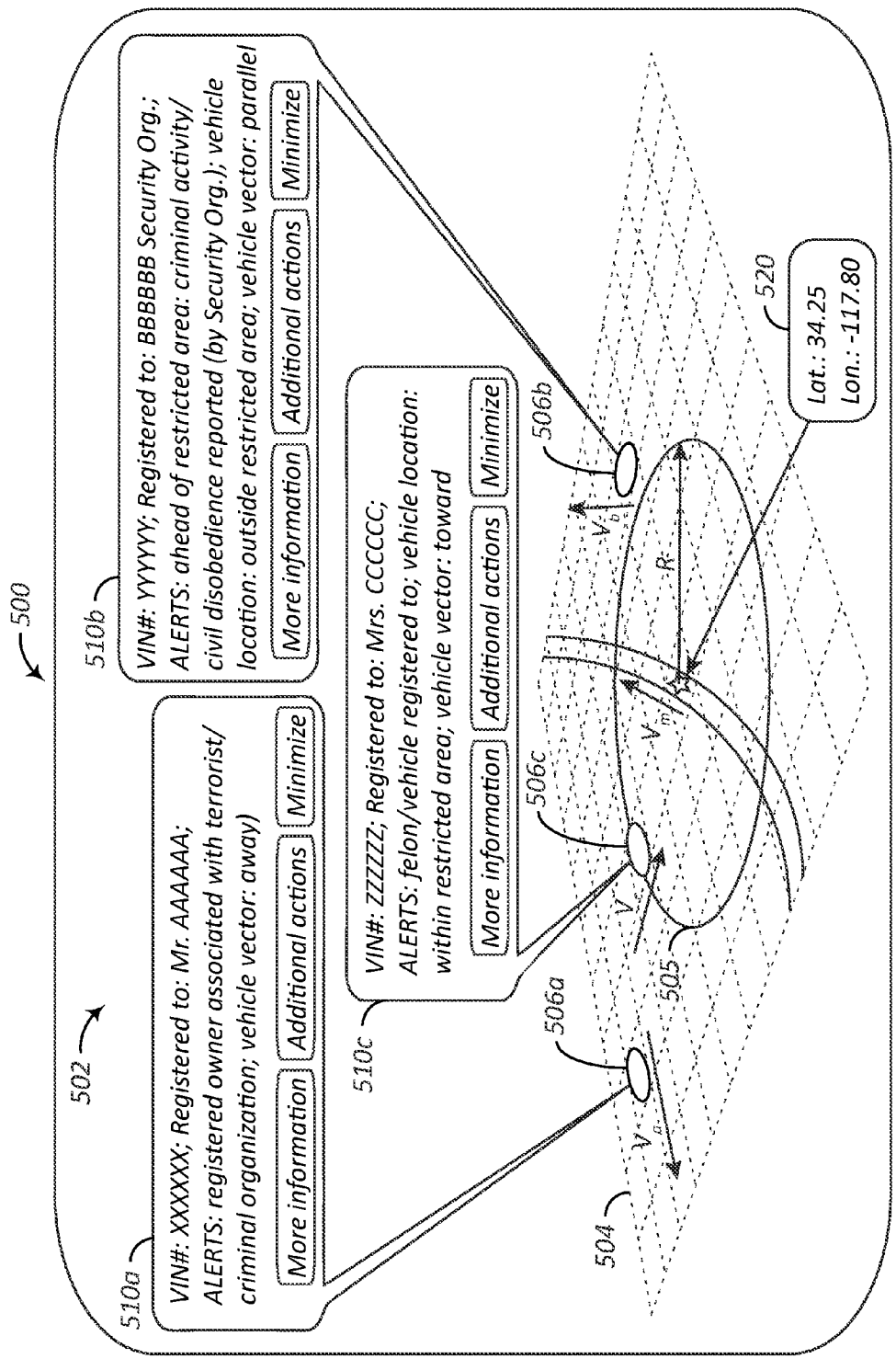
FIG. 5 shows another example interactive interface presenting a visual representation of a region, a restricted area within the region, vehicles within the region, and information associated with the vehicles.

FIG. 5 shows another example interactive interface 500 presenting a visual representation 502 of a region 504, a restricted area 505 within the region, vehicles 506a, 506b, and 506c within the region, and information associated with the vehicles. In this example, interface portions 510a, 510b, and 510c (of the interface 500) are controlled to provide information associated with the vehicles 506a, 506b, and 506c, respectively. Within each of the interface portions 510a, 510b, and 510c, sub-portions denoted "More information", "Additional actions", and "Minimize" are actuated, for example, by touching a location of the interface 500 bound by one of the sub-portions. For example, in response to selections and/or inputs provided at a menu or interface facilitating "Additional actions", a display portion 520 is generated to present latitude and longitude information for a particular vehicle. In this example, the interface portion 510a provides the following information about and/or associated with the vehicle 506a: "VIN#: XXXXXX; Registered to: Mr. AAAAAA; ALERTS: registered owner associated with terrorist/criminal organization; vehicle vector: away)". In this example, the interface portion 510b provides the following information about and/or associated with the vehicle 506b: "VIN#: YYYYYY; Registered to: BBBBBB Security Org.; ALERTS: ahead of restricted area: criminal activity/civil disobedience reported (by Security Org.); vehicle location: outside restricted area; vehicle vector: parallel". In this example, the interface portion 510c provides the following information about and/or associated with the vehicle 506c: "VIN#: ZZZZZZ; Registered to: Mrs. CCCCCC; ALERTS: felon/vehicle registered to; vehicle location: within restricted area; vehicle vector: toward".

Example methodologies and technologies described herein present, or facilitate a presentation of, visual representations of vehicles detected within a specified or otherwise determined area or region. In the example interface 500, a restricted area 505 is an area or region defined by a circular boundary existing at a radius R about a center point located at the "star" icon. In this example, the center point of the restricted area 505 moves with (e.g., tracks using GPS data) the location of the "star" icon (which, by way of example, serves as a visual representation of a vehicle in a presidential motorcade). An area or region can be specified or determined in various ways, resulting in boundaries that are circular, non-circular, square, rectangular, or other shapes. An area or region can be specified or determined such that it includes multiple portions (e.g., overlapping and/or non-overlapping portions), which can be stationary or fixed in relation to the region 504, move or reposition in relation to a location of a tracked vehicle, person, or object, or a combination of static and dynamically specified or determined portions (e.g., of a searched and/or monitored area or region).

The interface 500 is generated, for example, in response to a search request and includes visual representations presented in a user-friendly manner or other arrangement (e.g., appropriate for providing a law enforcement officer of other person with an arrangement of information optimized to permit reading of the most critical information first, for example, within each line of text presented). For example, if a law enforcement officer searches for all vehicles with a 5 block radius, the display 500 is controlled to present information about or associated with the detected vehicles (e.g., vehicle identification information, information about the registered owners of the vehicles, etc.) Search request criteria can be changed to accommodate different crime prevention scenarios. For example, the radius R can be set to 1/10 mile to identify vehicles located a short distance from a bank robbery, theft, or other crime in progress. In an example embodiment, search results are generated based on search criteria/circumstance, and further filtered, if desired. In example embodiments, search results can be analyzed immediately and/or at a later time. The data can also be retroactively analyzed (e.g., in consideration of additional information and/or data from other sources or devices).

In an example embodiment, the display 500 is controlled to present information including, for example, updated and/or new information or inputs provided by authorized or approved sources or devices. Updated and/or new information or inputs used to control generation of a visual representation at the display 500 can be provided, for example, in response to an interrupt or other signal generated by an officer in the field, citizen, or other person who has observed or become aware of criminal activity/civil disobedience (e.g., in association with, for example, a location, a vehicle, a person, and/or a group). Updated and/or new information or inputs used to control generation of a visual representation at the display 500 can also be provided, for example, by a person with an image capture device (e.g., equipped with code reading software), independent of whether the image capture device is configured to facilitate wireless communications. For example, images captured by the device (e.g., an authorized or approved device) can be transferred through a wired connection, removable memory component, or otherwise to another computer or device that communicates the image data and/or associated information to a processing center. Updated and/or new information or inputs used to control generation of a visual representation at the display 500 can also be provided, for example, via a Bluetooth, Wi-Fi, or other wireless communications link. For example, persons participating in or conducting surveillance, neighborhood watch, and/or various other "citizen sentinel" activities (e.g., while sitting at a sidewalk café at which a Wi-Fi connection is available) can be provided with access to a secure website or other interface through which they can provide updated and/or new information or inputs that can be used to control generation of a visual representation at the display 500. In this regard, information associated with such persons can also be used to assess the credibility or likely significance, importance, or criticality of information or inputs submitted by said persons.

Referring again to FIG. 3, an example method for monitoring and managing transportation infrastructure and locations of vehicles therein further includes adding information pertaining to one or more of the vehicle, an owner, a driver, a custodian, or a passenger of the vehicle, a person, an animal, or an object within, secured to, or transported by the vehicle, a person, an entity, an object, a status, a condition, an event, an indication, or an interrupt associated with the vehicle, the circumstance, and a location, an area, a region, or an environment within which the vehicle is located, or that the vehicle is approaching or departing from, to a database and/or using the information to update a database. In another example embodiment, the method for monitoring and managing transportation infrastructure and locations of vehicles therein further includes adding to or modifying the information, the circumstance, and/or the criteria in response to an input or inputs provided by one or more of, for example: a state, a county, a city, a town, or a municipality, a court, a government agency, a law enforcement agency, a department of motor vehicles, a parking and/or traffic enforcement agency, a company or other private-sector entity or organization, authorized operators and users of a system for monitoring and managing transportation infrastructure and locations of vehicles therein, an individual or a group provided with one or more authorized or approved devices, the use of which results in input(s) being provided, a person or an entity authorized or approved to receive or collect funds in relation to a parking or moving violation associated with the vehicle, an owner or a registered owner of the vehicle, a person or persons authorized or approved by the owner and/or the registered owner of the vehicle, a lienholder, an insurance company, an authorized or approved source (e.g., of inputs and/or data) or device (e.g., law enforcement agency transmitter devices and other authorized or approved transmitters, beacons, or communications devices), a processor or controller (e.g., of or in communication with an electronic tracking device monitoring the location of the vehicle), a biometric data acquisition device, a user-input mechanism (e.g., on-board touch screen, mobile communications device, and/or PCD of the registered owner of vehicle, emergency call devices), an RFID transmitter, a camera (e.g., a speed camera or other image capture device), a code reader (e.g., a device that reads a bar code or other code on the vehicle), and a parking meter (e.g., a device configured to monitor and manage usage of a parking space and to receive information and/or other inputs in association with a vehicle).

Figure 6:
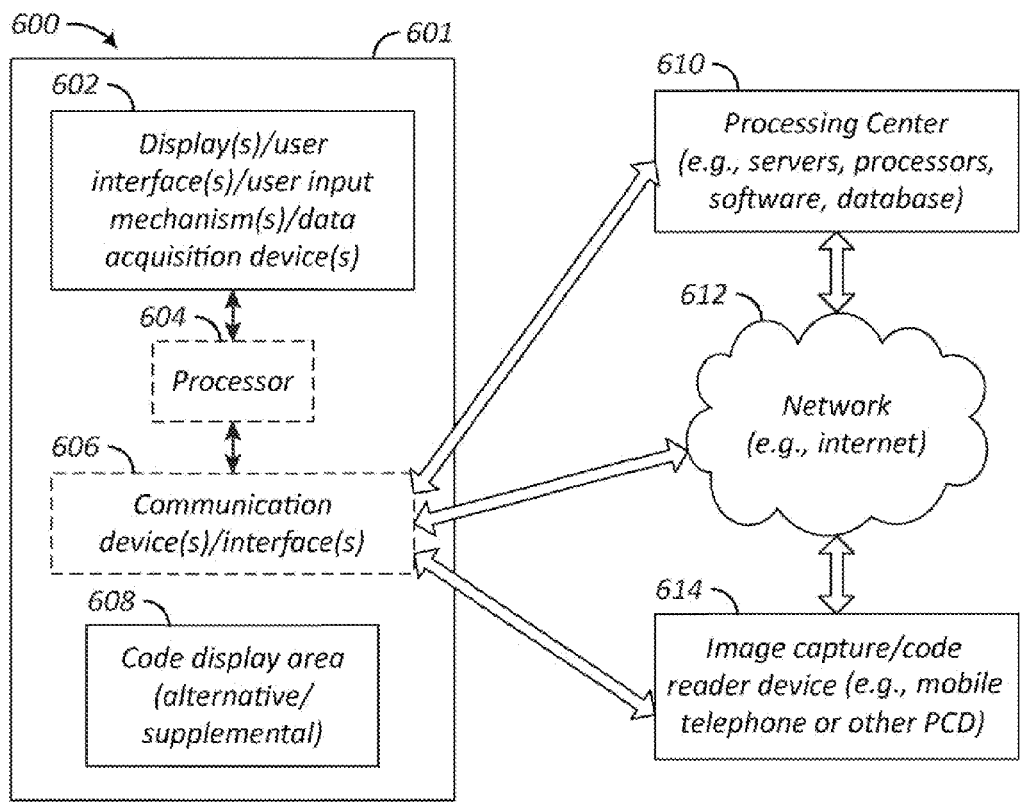
FIG. 6 shows an example apparatus for monitoring and managing usage of a parking space.

FIG. 6 shows an example apparatus 600 for monitoring and managing usage of a parking space. In an example embodiment, the apparatus 600 includes a parking meter 601 that facilitates providing information including a parking meter start time, a parking meter stop time, and an association between the parking meter and an account, and initiates or requests a transaction in which the account is charged (or debited) depending upon an amount of time passing between the start time and the stop time.

In an example embodiment, the association is between a uniquely identified parking meter and an account and is established utilizing a code. In an example embodiment, the association is established by a device that captures an image of the code and is configured with or utilizes or accesses code reader software that processes the image to read the code.

Figure 6A:
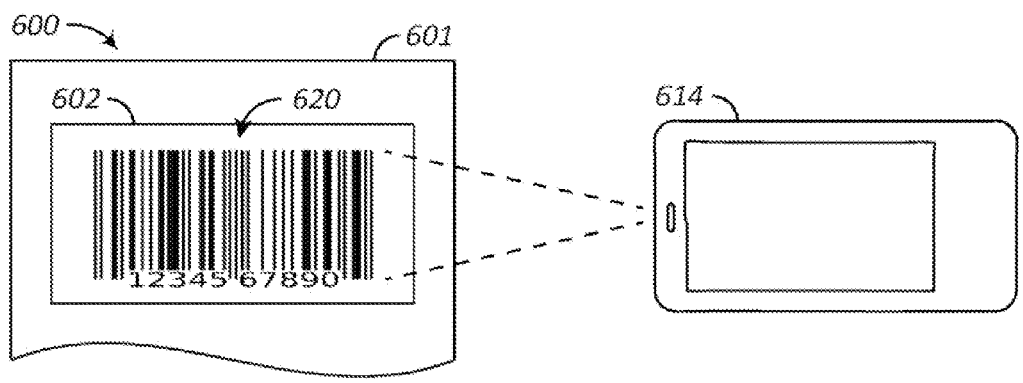
FIG. 6A shows an image capture/code reader device capturing an image of code provided on or generated by the parking meter apparatus of FIG. 6.

Referring again to FIG. 6, the parking meter 601 includes display(s)/user interface(s)/user input mechanism(s)/data acquisition device(s) 602, a processor 604, communication device(s)/interface(s) 606, and a code display area (alternative/supplemental) 608 configured as shown. In this example embodiment, the association is established utilizing a code provided on or generated by the parking meter 601. To this end, and referring also to FIG. 6A, an image capture/code reader device 614 (e.g., a mobile telephone, a smartphone, or a PCD) is utilized to capture an image of a code 620 (which is depicted, in this example, as a bar code) provided on or generated by the parking meter apparatus. In this example embodiment, the parking meter 601 is configured with (or utilizes or accesses) code generator software to generate the code 620 presented at the display 602. The code 620 can be provided in the form of numbers, letters, characters, symbols, and/or other indicia, whether visible or otherwise (e.g., code that is not revealed by visible light, but rather by infrared). The code 620 can be human-readable, machine-readable, or both. In an example embodiment, the code 620 is presented on the display 602 and/or printed, embossed, or applied on an external portion 608 of the parking meter 601 (e.g., provided on a metal plate secured to the parking meter 601).

The image capture/code reader device 614 can be provided, for example, in the form of a mobile telephone, a smartphone, or a PCD configured with a camera and with code reader software (and/or configured to utilize or access code reader software). Various software programs/products suitable for reading and/or decoding images of code captured by mobile telephones, smartphones, and PCDs are commercially available.

In this example embodiment, the communication device(s)/interface(s) 606 is configured to communicate with a processing center 610 (e.g., implemented in the form of servers, processors, or the like operating under the control of software and/or other sources of commands or inputs) directly and/or via a network 612 (e.g., the internet).

In an example embodiment, the parking meter 601 is configured to transmit or initiate a process of providing a communication to a device (e.g., the image capture/code reader device 614) that captures an image of the code 620. The communication can be provided directly from the parking meter 601 (e.g., generated by the processor 604), or from a remote processing location or center (e.g., in response to information provided to the processing center 610 by the parking meter 601). In an example embodiment, the communication includes a resource (e.g., URL) or other information that provides a user of the device with access to a receipt (e.g., PDF file/image) or other documentation or information relating to a transaction involving and/or usage of the parking meter.

In operation, the image capture/code reader device 614 is used to capture an image of the code 620 which, as previously discussed, can be presented at the processor-controlled display 602 and/or on the external display area 608. The external display area 608, as an alternative means for presenting the code 620, is useful for providing a lower cost parking meter (e.g., that is not configured to electronically present the code 620 at the display 602). The external display area 608, as a supplemental means for presenting the code 620, is useful for providing a parking meter that allows a user of the image capture/code reader device 614 to capture an image of the code 620 from a distance (e.g., while initially approaching the parking meter 601). In an example embodiment, the process of providing information including a parking meter start time, a parking meter stop time, and an association between the parking meter and an account can be performed utilizing the processor-controlled display 602 (at the parking meter 601), a user interface or other input mechanism separate from the parking meter 601 (e.g., presented on board the vehicle, at the image capture/code reader device 614, and/or at a mobile telephone, a smartphone, or a PCD of the registered owner of vehicle), or a combination thereof. For example, the process of providing information including a parking meter start time and an association between the parking meter and an account can be initiated by scanning or capturing an image of the code 620 presented at the external display area 608. In this example, the image capture/code reader device 614 captures an image of the code 620 and reads and/or decodes the captured image to establish the parking meter start time which is communicated to the parking meter 601 and/or the processing center 610 along with other information (e.g., stored on board or accessible to the image capture/code reader device 614) that can be used to establish the association between the parking meter and an account (e.g., an account associated with the owner of the image capture/code reader device 614). The association between the parking meter 601 and an account can be established at the parking meter start time or at another time. In an example embodiment, both the parking meter start and stop times are established utilizing the code 620 (e.g., by capturing an image of the code 620, reading and/or decoding the captured image, and communicating information including the start and stop times to the parking meter 601 and/or the processing center 610. In an example embodiment, the parking meter 601 is configured to establish the stop time utilizing an alternative code (e.g., provided to a person authenticated as being associated with the account and/or with a vehicle associated with the account). This accommodates a circumstance (occurring, for example, at a parking lot or parking garage) in which the driver has lost or cannot locate the image capture/code reader device 614, in response to which an attendant can provide the driver with an alternative code that the driver can use (e.g., keyed in or otherwise provided as an input at the display 602) to establish the parking meter stop time.

In an example embodiment, the parking meter 601 includes an interactive user interface, a graphical user interface, or display configured to provide a visual representation of one or more of, for example: an acknowledgement that the association, the start time and/or the stop time has been established, a prompt or request for additional information or user inputs (e.g., to associate a new/different/valid account with the generated code, to renew registration/license/insurance, to authorize transfer of funds for renewal of driver's license/vehicle registration/automobile insurance), information and/or instructions (e.g., hours when the parking space can be used, maximum amount of time permitted to park in the space/lot, how to obtain an alternative code if an authorized image capture/code reader device is lost, misplaced, or inoperative), a notification (e.g., a message notifying a person who has been in California for 20 days that they need to register their vehicle if they now reside in California), and a warning (e.g., a text message, such as: "When you were driving in [town, street] on [day] at approximately [time], you were traveling at an excessive speed. This is a courtesy warning. Next time, you will receive a citation and fine, and possibly additional penalties, impounding of your vehicle, and/or suspension or revocation of your driver's license as may be appropriate or required under the law.")

In an example embodiment, the parking meter 601 (and/or a remote processing location/center in communication with the parking meter) is configured to access supplemental information identifying and/or in relation to a vehicle, person, entity and/or object associated with the account. In another example embodiment, the parking meter 601 (and/or a remote processing location/center in communication with the parking meter) is configured to provide or facilitate access to the supplemental information, parking meter usage information, and/or notifications relating to said information by one or more of, for example: an owner, an operator, or a vendor of the parking meter, a maintenance or service company, authorized operators and users of a system for monitoring and managing transportation infrastructure and locations of vehicles therein, a law enforcement agency, a parking enforcement agency, a government agency, a company or other private-sector entity or organization, a lienholder, an insurance company, authorized or approved individuals or groups, an owner or a registered owner of the vehicle, and a person or persons authorized or approved by the owner and/or the registered owner of the vehicle.

Figure 7:
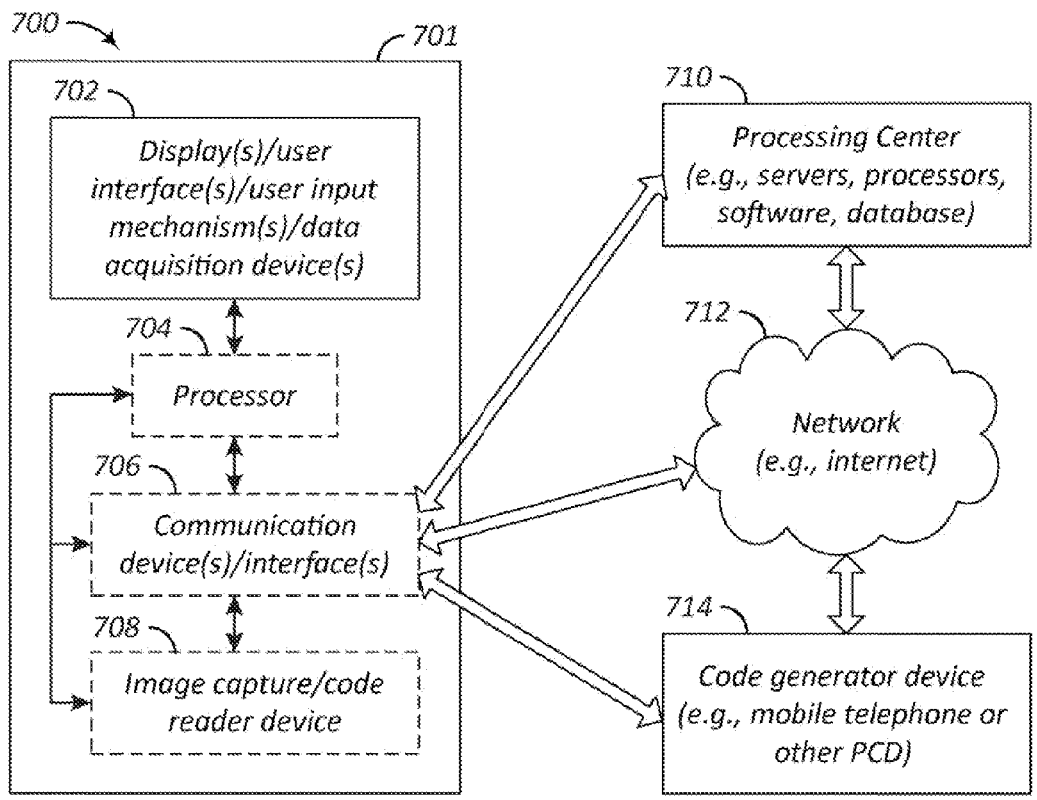
FIG. 7 shows another example apparatus for monitoring and managing usage of a parking space.

FIG. 7 shows another example apparatus 700 for monitoring and managing usage of a parking space. In an example embodiment, the apparatus 700 includes a parking meter 701 that facilitates providing information including a parking meter start time, a parking meter stop time, and an association between the parking meter and an account, and initiates or requests a transaction in which the account is charged (or debited) depending upon an amount of time passing between the start time and the stop time.

In an example embodiment, the association is between a uniquely identified parking meter and an account and is established utilizing a code. In an example embodiment, the association is established by a device that captures an image of the code and is configured with or utilizes or accesses code reader software that processes the image to read the code.

Figure 7A:
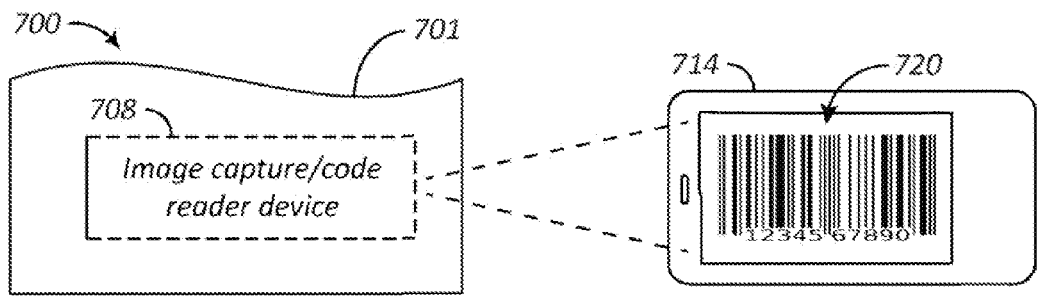
FIG. 7A shows code generated by a code generator device being captured by the image capture/code reader device of the parking meter apparatus of FIG. 7.

Referring again to FIG. 7, the parking meter 701 includes display(s)/user interface(s)/user input mechanism(s)/data acquisition device(s) 702, a processor 704, communication device(s)/interface(s) 706, and an image capture/code reader device 708 configured as shown. In this example embodiment, the association is established utilizing a code provided on or generated by a code generator device. To this end, and referring also to FIG. 7A, a code generator device 714 (e.g., a mobile telephone, a smartphone, or a PCD) is utilized to generate an image of a code 720 (which is depicted, in this example, as a bar code). In this example embodiment, the code generator device 714 is configured with (or utilizes or accesses) code generator software to generate the code 720 (e.g., presented at a display of a mobile telephone, a smartphone, or a PCD). The code 720 can be provided in the form of numbers, letters, characters, symbols, and/or other indicia, whether visible or otherwise (e.g., code that is not revealed by visible light, but rather by infrared). The code 720 can be human-readable, machine-readable, or both. In an example embodiment, the code 720 includes information (e.g., VIN) that uniquely identifies a vehicle.

The image capture/code reader device 708 can be provided, for example, in the form of a digital camera or other image capture device (of the parking meter 701) and code reader software run by (and/or utilized or accessible to) the processor 704. In an example embodiment, the processor 704 processes the image captured by the image capture/code reader device 708 to read the code 720. Various software programs/products suitable for reading and/or decoding images of code captured by digital cameras or other image capture devices are commercially available.

In this example embodiment, the communication device(s)/interface(s) 706 is configured to communicate with a processing center 710 (e.g., implemented in the form of servers, processors, or the like operating under the control of software and/or other sources of commands or inputs) directly and/or via a network 712 (e.g., the internet).

In an example embodiment, the parking meter 701 is configured to transmit or initiate a process of providing a communication to a device (e.g., the code generator device 714) that generates an image of the code 720. The communication can be provided directly from the parking meter 701 (e.g., generated by the processor 704), or from a remote processing location or center (e.g., in response to information provided to the processing center 710 by the parking meter 701). In an example embodiment, the communication includes a resource (e.g., URL) or other information that provides a user of the device with access to a receipt (e.g., PDF file/image) or other documentation or information relating to a transaction involving and/or usage of the parking meter.

In operation, the image capture/code reader device 708 is used to capture an image of the code 720 presented at a display of the code generator device 714. In an example embodiment, the process of providing information including a parking meter start time, a parking meter stop time, and an association between the parking meter and an account can be performed utilizing the processor-controlled display 702 (at the parking meter 701), a user interface or other input mechanism separate from the parking meter 701 (e.g., presented on board the vehicle, at the code generator device 714, and/or at a mobile communications device or PCD of the registered owner of vehicle), or a combination thereof. For example, the process of providing information including a parking meter start time and an association between the parking meter and an account can be initiated by scanning or capturing an image of the code 720 presented at a display of the code generator device 714. In this example, the image capture/code reader device 708 captures an image of the code 720 and reads and/or decodes the captured image to establish the parking meter start time which is communicated to the processor 704 (of parking meter 701) and/or the processing center 710 along with other information (e.g., provided by the code generator device 714) that can be used to establish the association between the parking meter and an account (e.g., an account associated with the owner of the code generator device 714). The association between the parking meter 701 and an account can be established at the parking meter start time or at another time. In an example embodiment, both the parking meter start and stop times are established utilizing the code 720 (e.g., by capturing an image of the code 720, reading and/or decoding the captured image, and communicating information including the start and stop times to the processor 704 (of parking meter 701) and/or the processing center 710. In an example embodiment, the parking meter 701 is configured to establish the stop time utilizing an alternative code (e.g., provided to a person authenticated as being associated with the account and/or with a vehicle associated with the account). This accommodates a circumstance (occurring, for example, at a parking lot or parking garage) in which the driver has lost or cannot locate the code generator device 714, in response to which an attendant can provide the driver with an alternative code (e.g., a printed image of the alternative code) that the driver can use (e.g., present the alternative code to the image capture/code reader device 708) to establish the parking meter stop time. In an example embodiment, a vending machine, a kiosk, or other publicly accessible interface, console, or station (e.g., that monitors and/or manages the metering of multiple parking spaces) is configured to allow a driver or other person to initiate or submit a request to be provided with an alternative code.

In an example embodiment, the parking meter 701 includes an interactive user interface, a graphical user interface, or display configured to provide a visual representation of one or more of, for example: an acknowledgement that the association, the start time and/or the stop time has been established, a prompt or request for additional information or user inputs (e.g., to associate a new/different/valid account with the generated code, to renew registration/license/insurance, to authorize transfer of funds for renewal of driver's license/vehicle registration/automobile insurance), information and/or instructions (e.g., hours when the parking space can be used, maximum amount of time permitted to park in the space/lot, how to obtain an alternative code if an authorized code generator device is lost, misplaced, or inoperative), a notification (e.g., a message notifying a person who has been in California for 20 days that they need to register their vehicle if they now reside in California), and a warning (e.g., a text message, such as: "When you were driving in [town, street] on [day] at approximately [time], you were traveling at an excessive speed. This is a courtesy warning. Next time, you will receive a citation and fine, and possibly additional penalties, impounding of your vehicle, and/or suspension or revocation of your driver's license as may be appropriate or required under the law.")

In an example embodiment, the parking meter 701 (and/or a remote processing location/center in communication with the parking meter) is configured to access supplemental information identifying and/or in relation to a vehicle, person, entity and/or object associated with the account. In another example embodiment, the parking meter 701 (and/or a remote processing location/center in communication with the parking meter) is configured to provide or facilitate access to the supplemental information, parking meter usage information, and/or notifications relating to said information by one or more of, for example: an owner, an operator, or a vendor of the parking meter, a maintenance or service company, authorized operators and users of a system for monitoring and managing transportation infrastructure and locations of vehicles therein, a law enforcement agency, a parking enforcement agency, a government agency, a company or other private-sector entity or organization, a lienholder, an insurance company, authorized or approved individuals or groups, an owner or a registered owner of the vehicle, and a person or persons authorized or approved by the owner and/or the registered owner of the vehicle.

In an example "Parking Meter Digital Registration" technology and/or methodology, parking meters are provided with a code and/or a code generating device. In this example, a driver of a vehicle uses an image capture/code reader device such as a mobile telephone, a smartphone, or a PCD configured with a camera and with code reader software (and/or configured to utilize or access code reader software) to scan or capture an image of the code in order to activate the parking meter and/or establish a parking meter start time. Upon return, the driver can scan or image the code again and initiate and/or authorize a process of paying a parking fee for the duration of the time the vehicle has been parked. For example, the payment is automatically deducted from an account which has been previously set up or charged to a credit card.

In another example "Parking Meter Digital Registration" technology and/or methodology, parking meters are provided with an image capture/code reader device. In this example, a driver of a vehicle uses a code generator device such as a mobile telephone, a smartphone, or a PCD configured with a display and with code generator software (and/or configured to utilize or access code generator software) to generate an image of the code, which is read by the parking meter in order to activate the parking meter and/or establish a parking meter start time. Upon return, the image capture/code reader device (of the parking meter) is used to scan or image the code again and initiate and/or authorize a process of paying a parking fee for the duration of the time the vehicle has been parked. For example, the payment is automatically deducted from an account which has been previously set up or charged to a credit card.

In either case, a driver no longer has to have ready access to coins in order to pay for parking and avoids the unfortunate and all-too-frequent necessity of having to return to "feed" the parking meter. In an example embodiment, information identifying the parking meter and/or parking space is synchronized or associated with information pertaining to the vehicle and/or the driver. For example, information obtained from the driver's mobile telephone, smartphone, or PCD (e.g., during the process of activating the parking meter) is utilized to access the VIN of the vehicle from a database. In an example embodiment, an account (e.g., an account associated with the VIN) is automatically charged the parking fee. In an example embodiment, the parking fee is charged, debited, or billed to an account associated with, for example: an identified vehicle (e.g., identified by VIN), a mobile telephone, a smartphone, a PCD, an image capture device, a code reader device (e.g., a bar code scanner/reader), a code generator device, or other data input mechanism (e.g., that facilitates providing a code to a parking meter or an image capture/code reader device).

By way of further example, a registered owner of a vehicle is associated with an account that is linked to a credit card and/or allowed or required to maintain a deposit account in order to have credit available from which parking fees can be drawn (e.g., in association with a particular VIN). When a vehicle is parked in a specific parking space, then, without depositing coins, based upon the duration of use, an account is charged by a computer system. In this manner, the account (e.g., associated with the VIN) is only charged for the time of use while parked. As a consequence, parking fees are determined and charged with greater precision representing an advantage for drivers as compared to the current system where most people leave their parking space with unused time left on a meter. In an example embodiment, if the account to be charged lacks sufficient funds to pay a parking fee, a computer (or processing center of the like) can be programmed to automatically initiate a process of transmitting a citation and/or bill, by e-mail and/or mail, to the registered owner.

In an example embodiment, the VIN is transmitted and/or detected, and a computer program is used to identify when a particular vehicle is parked for more than an allowable period of time at a parking space and to automatically issue a citation to the registered owner. For example, a citation can be issued for a car parked in public streets with an expired registration. In another example, a citation is issued to someone associated with a vehicle parked in a no-parking zone or a red-zone. Due to the relatively small number of parking enforcement officers as compared to the number of vehicles (in a typical city or town), an accurate and substantially completely automated citation system can significantly increase parking revenues generated and can also eliminate or reduce the need for parking enforcement officers.

Figure 8:
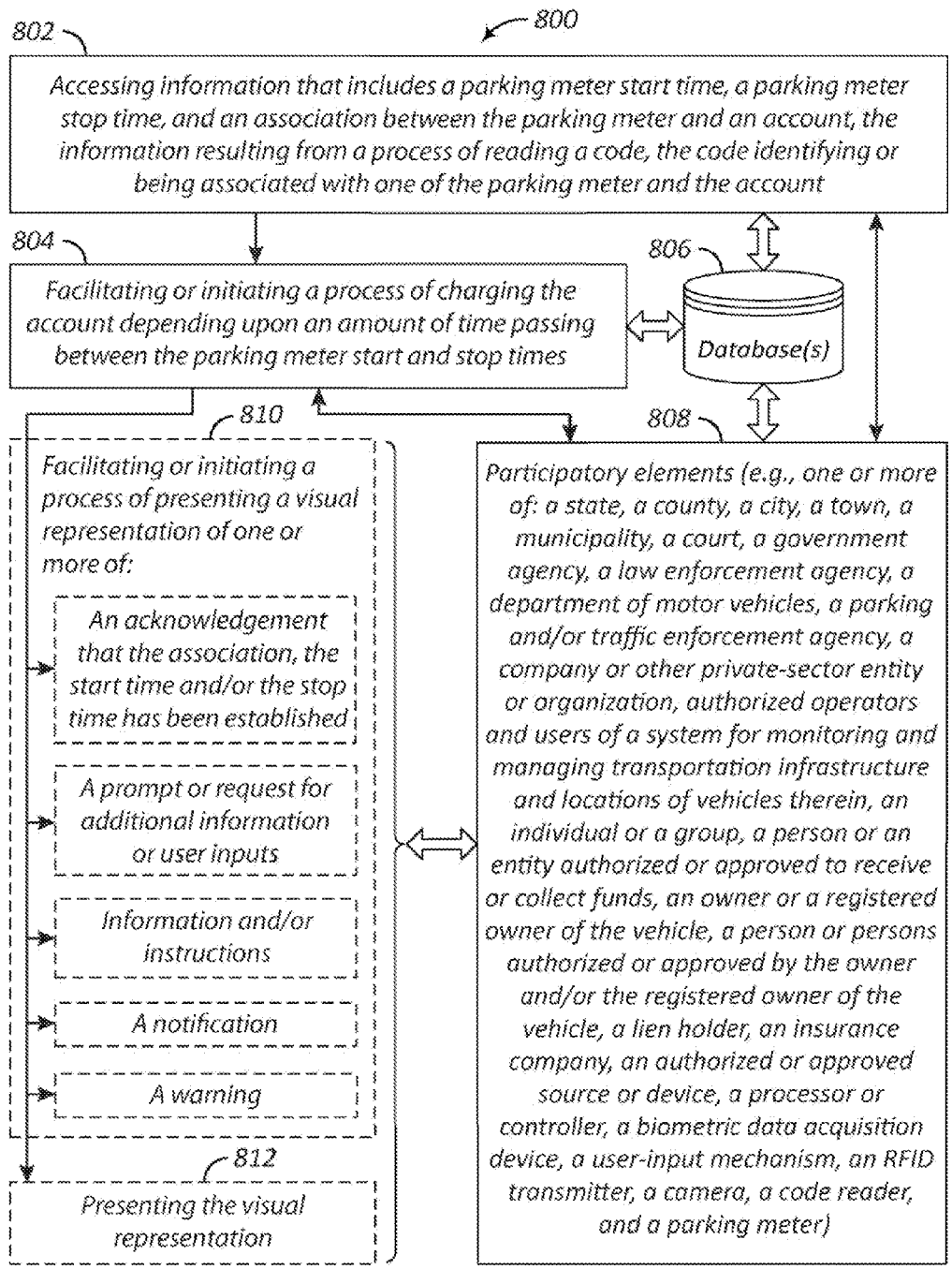
FIG. 8 shows an example implementation of a method for monitoring and managing usage of a parking space.

FIG. 8 shows an example implementation of a method 800 for monitoring and managing usage of a parking space. At 802, information is accessed, namely, information that includes a parking meter start time, a parking meter stop time, and an association between the parking meter and an account, the information resulting from a process of reading a code, the code identifying or being associated with one of the parking meter and the account. In an example embodiment, the association is between a uniquely identified parking meter and an account. In an example embodiment, the association is established at a parking meter start time. In an example embodiment, the process of reading a code includes reading the code two times or reading code at two different times (e.g., at a parking meter start time and at a parking meter stop time).

In example embodiments, signals transmitted from a parking meter and/or a vehicle are received (e.g., and referring also to FIGS. 1, 6, and 7, by one or more of, for example: a network, satellites, one or more processing centers, one or more system interfacing elements, one or more image capture/code reader devices, and one or more code generator devices. The signals can include information relating to (e.g., identifying) one or more of, for example: the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle. In an example embodiment, the signals are received over an interval of time.

At 804, a process of charging the account depending upon an amount of time passing between the parking meter start and stop times is facilitated or initiated. In an example embodiment, the signals and/or information can be processed to identify in association with the vehicle a circumstance that satisfies (predetermined or other) criteria. The signals and/or information are processed, for example, by one or more processing centers and/or one or more of the system interfacing elements (e.g., operators, users, and/or devices involved in or facilitating a system for monitoring and managing transportation infrastructure and locations of vehicles therein). In example embodiments, the signals and/or information are processed at least in part by participatory elements 808. By way of example, the participatory elements 808 include one or more of: a state, a county, a city, a town, a municipality, a court, a government agency, a law enforcement agency, a department of motor vehicles, a parking and/or traffic enforcement agency, a company or other private-sector entity or organization, authorized operators and users of a system for monitoring and managing transportation infrastructure and locations of vehicles therein, an individual or a group, a person or an entity authorized or approved to receive or collect funds, an owner or a registered owner of the vehicle, a person or persons authorized or approved by the owner and/or the registered owner of the vehicle, a lienholder, an insurance company, an authorized or approved source or device, a processor or controller, a biometric data acquisition device, a user-input mechanism, an RFID transmitter, a camera, a code reader, and a parking meter. In example embodiments, information, data, and/or programs stored in one or more database(s) 806 is utilized in processing the signals and/or information. The database(s) 806 include one or more of, for example, a law enforcement database, a DMV database, an insurance database, and a lienholder database. It should be understood that the database(s) 806 can include additional database(s) pertaining, for example, to other types of information and/or data as described herein.

Example methodologies and technologies described herein present, or facilitate a presentation of, visual representations pertaining to a vehicle, a circumstance, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle, information, and/or notifications. Example implementations utilize a network and/or communications links and one or more interfaces and/or displays are to present the visual representations. The circumstances include, by way of example, one of more of the previously discussed circumstances, the discussion of which is incorporated herein by reference.

At 810, an action or a process is facilitated, controlled, or initiated (e.g., by one or more of the participatory elements 808). The action or process involves presenting a visual representation of one or more of, for example: an acknowledgement that the association, the start time and/or the stop time has been established, a prompt or request for additional information or user inputs, information and/or instructions, a notification, and a warning. In an example embodiment, a method for monitoring and managing usage of a parking space includes facilitating or initiating a process of presenting (e.g., at an interactive user interface, a graphical user interface, or a display) a visual representation of one or more of, for example, an acknowledgement that the association, the start time and/or the stop time has been established, a prompt or request for additional information or user inputs (e.g., to associate a new/different/valid account with the generated code, to renew registration/license/insurance, to authorize transfer of funds for renewal of driver's license/vehicle registration/automobile insurance), information and/or instructions (e.g., hours when the parking space can be used, maximum amount of time permitted to park in the space/lot, how to obtain an alternative code if an authorized image capture/code reader device or code generator device is lost, misplaced, or inoperative), a notification (e.g., a message notifying a person who has been in California for 20 days that they need to register their vehicle if they now reside in California), and a warning (e.g., a text message, such as: "When you were driving in [town, street] on [day] at approximately [time], you were traveling at an excessive speed. This is a courtesy warning. Next time, you will receive a citation and fine, and possibly additional penalties, impounding of your vehicle, and/or suspension or revocation of your driver's license as may be appropriate or required under the law."). In an example embodiment, the process can also include processing the signals and/or the information to identify in association with the parking meter and/or the vehicle a circumstance that satisfies criteria for facilitating, controlling, or initiating an action or a process involving one or more of providing information, providing a notification, transferring funds, and issuing a ticket, a citation, a bill, an invoice, a warning, or other communication.

At 812, a visual representation is presented (e.g., to one or more of the participatory elements 808). By way of example, the visual representation presented is a visual representation of one or more of: the parking meter, a mobile telephone or other PCD, a device that generates the code, a device that reads the code, a device, interface, or display that is separate from the parking meter (e.g., a workstation, interface, vending machine, kiosk), and a device, interface, or display that is remotely located in relation to the parking meter (e.g., a processing/monitoring center, facility, or station).

An example method for monitoring and managing usage of a parking space further includes providing, facilitating, or initiating a communication that includes a resource (e.g., URL) or other information that provides access to a receipt (e.g., PDF file/image) or other documentation or information relating to a charge to the account and/or usage of the parking meter.

An example method for monitoring and managing usage of a parking space further includes accessing, or facilitating or initiating a process of providing access to, supplemental information pertaining to one or more of a vehicle, a person, an entity, and an object associated with the account. In an example embodiment, the method for monitoring and managing usage of a parking space further includes accessing, or facilitating or initiating a process of providing access to, the supplemental information, parking meter usage information, and/or notifications relating to said information by one or more of, for example: an owner, an operator, or a vendor of the parking meter, a maintenance or service company, authorized operators and users of a system for monitoring and managing transportation infrastructure and locations of vehicles therein, a law enforcement agency, a parking enforcement agency, a government agency, a company or other private-sector entity or organization, a lienholder, an insurance company, authorized or approved individuals or groups, an owner or a registered owner of the vehicle, and a person or persons authorized or approved by the owner and/or the registered owner of the vehicle.

Figure 9:
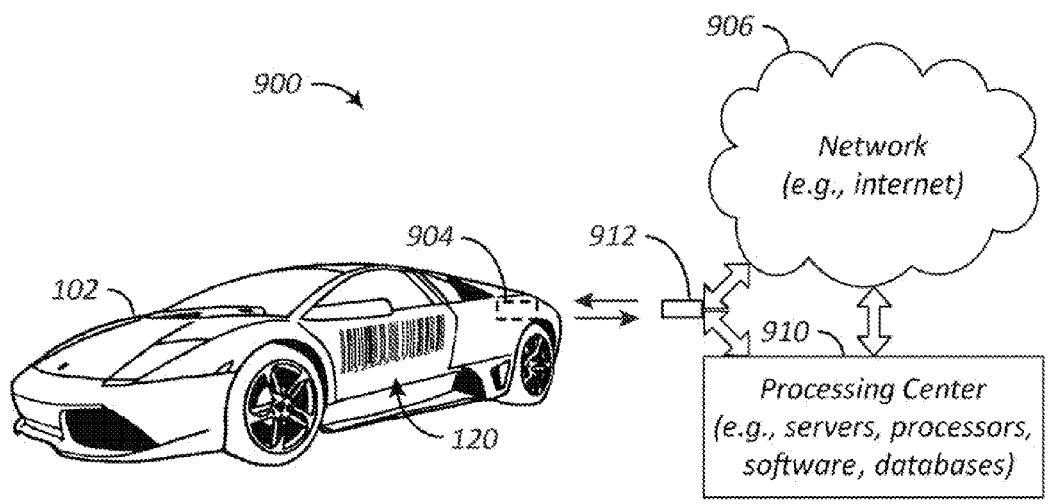
FIG. 9 shows an example implementation of a system for monitoring, managing, and facilitating transactions involving vehicles.

FIG. 9 shows an example implementation of a system 900 for monitoring, managing, and facilitating transactions involving vehicles. In this example implementation, a vehicle 102 is equipped with an electronic device 904 (shown in dashed lines) configured to communicate with a network 906 (e.g., the internet) via another electronic device 912. In an example implementation, the network 906 is also utilized to facilitate communications links between a processing center 910 (e.g., implemented in the form of servers, processors, or the like operating under the control of software and/or other sources of commands or inputs) and the electronic device 912.

In an example embodiment, the electronic device 904 includes a transponder or transmitter that generates or transmits signals that identify a vehicle equipped with the electronic device 904, and the electronic device 912 includes a receiver (e.g., a transponder or transceiver) configured to receive the signals. The electronic devices 904 and 912 are provided, for example, in the form of a RFID tag and a RFID reader, respectively.

In example embodiments, the electronic device 904 additionally includes, and/or is configured to interface with, electronics (or components thereof) such as previously described in relation to the electronic tracking device 104. The electronic device 904 can include, for example, a Global Positioning System (GPS) tracking device or unit (e.g., a GPS module configured to receive GPS signals from the satellites 108a, 108b, and 108c and calculate coordinates) and a modem or other communications device configured to transmit location and telemetry input data. Thus, in example embodiments, the electronic device 904 includes a GPS tracking device or unit. In example embodiments, the electronic device 904 includes, and/or is configured to interface with, electronics (or components thereof) such as previously described in relation to the communications device(s) 204, the input/output (I/O)/interface control device(s) 208, the transmitter(s) 210, the data acquisition device(s) 212, and the user interface(s) and/or other input mechanism(s) 214. Thus, in example embodiments, the electronic device 904 is configured to facilitate communications and/or interfacing elements, such as previously described in relation to the system interfacing elements 112 (e.g., authorized or approved system service providers, information providers/sources, participants, devices, users, partners, and/or subscribers). In example embodiments, the network 906 is additionally utilized to facilitate communications links between the electronic device 904 and one or more of the processing center 910 and the aforementioned system interfacing elements. Thus, in example embodiments, the electronic device 912 is a system interfacing element of the electronic device 904 and/or vice versa.

Figure 10:
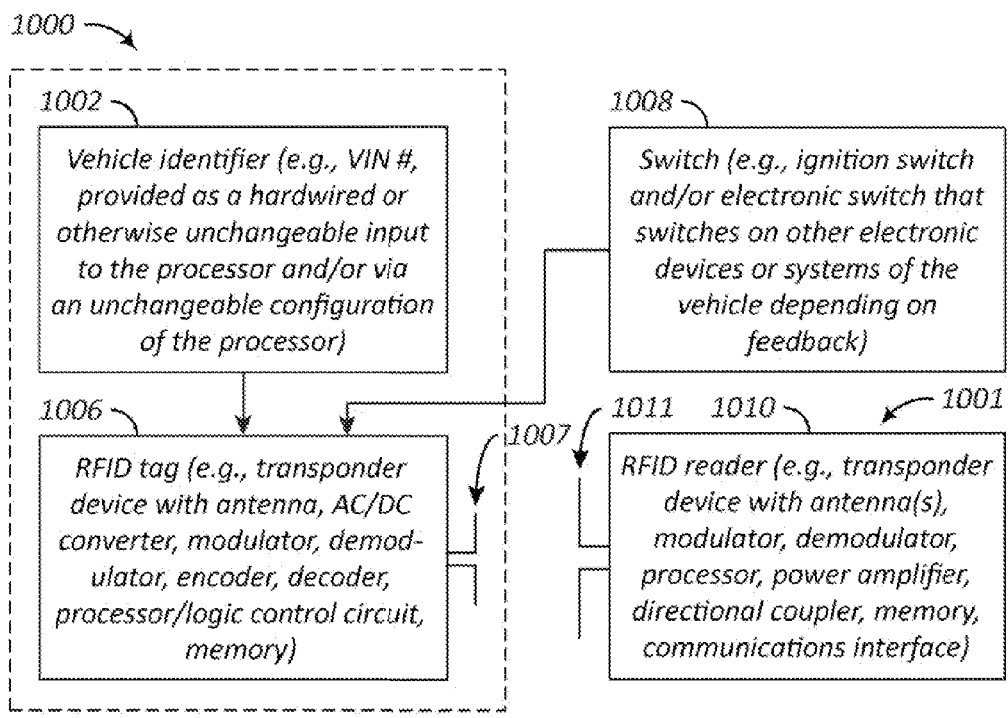
FIG. 10 shows an example electronic device suitable for the system of FIG. 9.

Referring to FIG. 10, example electronic devices 1000 and 1001 (suitable for the system 900 for monitoring, managing, and facilitating transactions involving vehicles) are shown. In example embodiments, the electronic devices 1000 and 1001 each include one or more electronic devices. In the example embodiments depicted in FIG. 10, the electronic device 1000 includes a RFID tag 1006 with an antenna 1007 (e.g., a dipole antenna) and a vehicle identifier 1002, which provides an input to the RFID tag 1006. In this example embodiment, the electronic device 1000 also includes or is operatively connected to a switch 1008 (e.g., for providing an additional input to the RFID tag 1006). The electronic device 1001 includes an RFID reader 1010 with an antenna 1011 (e.g., a dipole antenna).

The vehicle identifier 1002 can be, for example, the VIN of the vehicle equipped with the electronic device 1000 or other numbers, letters, characters, symbols, codes, or the like, whether human-readable, machine-readable, or both. In an example embodiment, the vehicle identifier 1002 includes, represents, and/or provides vehicle identification information that uniquely identifies the vehicle equipped with the electronic device 1000. In an example embodiment, the electronic device 1000 is configured such that the vehicle identification information cannot be changed or prevented from being transmitted or generated during normal operation of the electronic device. By way of example, the vehicle identifier 1002 is implemented/provided as a hardwired or otherwise unchangeable input to the RFID tag 1006 and/or via an unchangeable configuration of the RFID tag 1006. Moreover, in an example embodiment, the electronic device 1000 is configured such that an attempt to change, modify, damage, make unauthorized alterations to, or otherwise tamper with the vehicle identifier 1002 and/or RFID tag 1006 results in an alert or alarm being generated, e.g., transmitted by one or more communications devices of the electronic device 1000 (such as the previously described communications device(s) 204). In various example embodiments, the electronic device 1000 includes a communications device facilitating one or more of cellular, radio and satellite communications.

The RFID tag 1006 includes or is implemented utilizing, for example, a transponder device with an antenna, an AC/DC converter, a modulator, a demodulator, an encoder, a decoder, a processor/logic control circuit, and memory. The RFID reader 1010 includes or is implemented utilizing, for example, a transponder device with antenna(s), a modulator, a demodulator, a processor, a power amplifier, a directional coupler, memory, and a communications interface. In an example embodiment, the RFID reader 1010 is configured as an interrogator, e.g., emits RF carrier signals (continuously or otherwise) and observes received RF signals for data. In the presence of the RFID tag 1006, signals emitted by the RFID reader 1010 are modulated by the RFID tag 1006, and the modulated signals are detected by the RFID reader 1010. In this example, the RFID reader 1010 demodulates the signals received from the RFID tag 1006 and decodes the demodulated signals. Backscatter modulation is utilized, by way of example, to modulate data onto the RF carrier with the RFID reader 1010 detecting changes in the RF carrier amplitude and recovering the data (e.g., code).

In example embodiments, the RFID tag 1006 is only powered when it is in the beam of the interrogator. In example embodiments, the RFID tag 1006 is powered by a battery or other power source (e.g., the vehicle battery), which in some circumstances potentially improves range. The RFID tag 1006 and the RFID reader 1010 can be configured to utilize transponder-driven and/or other communications protocols, various implementations of such protocols being known to one of ordinary skill in the art.

In an example embodiment, the vehicle is equipped with a switch (such as, for example, the switch 1008), and the signals are generated or transmitted depending upon a position, state, or output of the switch. By way of example, the switch 1008 can be an ignition switch and/or an electronic switch that switches on (e.g., applies power to) other electronic devices or systems of the vehicle depending on feedback (e.g., from the ignition lock cylinder of the vehicle). The switch 1008 can be a mechanical switch configured, for example, to be accessible from inside the vehicle (e.g., located inside the glove compartment, or at a hidden and/or selectively publicized location). Alternatively, the switch 1008 can be located at an exterior portion of the vehicle, such as the wheel well, or within the engine compartment or trunk.

The switch 1008, configured for providing an additional input to the RFID tag 1006, can be used to accommodate, facilitate, select, and/or initiate different modes of operation. For example, the electronic device 1000 can be selectively configured, depending upon whether the vehicle is running, to operate in either a "passive tag" mode (e.g., in which the RFID tag 1006 is only powered when it is in the beam of the interrogator) or an "active tag" mode (e.g., in which the RFID tag 1006 is powered by a battery or other power source). In an example embodiment, the signals are generated or transmitted only when the motor is running. In an example embodiment, the signals are generated or transmitted only when the motor is running and in response to a transmit command (e.g., provided by the driver or other person in the vehicle). The transmit command (and other commands and/or inputs as well) can be communicated to the electronic device 1000 via a signal received from another electronic device, or provided by another source or device. In an example embodiment, the signals are generated or transmitted independent of whether the motor is running.

In an example embodiment, the electronic device 1000 includes, or is operatively connected to, circuitry for enabling and/or disabling the RFID tag 1006. The aforementioned circuitry can include the switch 1008 and/or is configured to be controllable by the switch 1008 or by one or more other inputs and/or commands.

Mode selection inputs (as well as other inputs and/or commands) can be provided via an input/output (I/O)/interface control device of the electronic device 1000, such as previously described in relation to the input/output (I/O)/interface control device(s) 208. Mode selection inputs (as well as other inputs and/or commands) can be provided remotely, e.g., utilizing a wireless communications device.

In example embodiments, the RFID tag 1006 selectively utilizes a mode or protocol (e.g., a transponder-driven protocol) depending, for example, upon the switch 1008 and/or one or more inputs and/or commands provided via an input/output (I/O)/interface control device.

In example systems, apparatuses, and methods described herein, the electronic device is selectively controllable for generating or transmitting the signals in multiple different operating modes. In an example embodiment, the electronic device 1000 receives a mode selection input (provided, for example, by the switch 1008, or via an input/output (I/O)/ interface control device).

The RFID tag 1006 and the RFID reader 1010 can be configured to utilize far-field RFID technologies in which, for example, the RFID tag 1006 is read at a location beyond (outside) the range of the near-field of the RFID reader 1010. Backscatter modulation can be utilized in such implementations. Dimensions and/or impedances of the antennas 1007 and 1011 can be adjusted to tune to a particular frequency, control how much of the energy is reflected back (e.g., from the RFID tag 1006 toward the RFID reader 1010), and/or vary an amount of energy reflected back (e.g., to encode information provided by the RFID tag 1006).

The RFID tag 1006 and the RFID reader 1010 can be configured to utilize near-field RFID technologies in which, for example, the antenna 1007 of the RFID tag 1006 is located in the near-field of the antenna 1011 of the RFID reader 1010. For example, ultra high frequency (UHF) near-field radio frequency identification (RFID) devices can be utilized.

The terms "far-field" and "near-field" refer to regions, in relation to an antenna, in which a particular field effect (or combinations of field effects) is the dominant interaction that characterizes field behavior of the antenna within that particular region. The term "far-field" refers, for example, to a region (e.g., that extends from approximately two wavelengths distance from the antenna to infinity) in which the field of the antenna acts as "normal" electromagnetic radiation, the power of which decreases as the square of distance from the antenna. The term "near-field" refers, for example, to a region (e.g., within approximately one wavelength distance from the antenna) in which there are strong inductive and capacitative effects, which decrease in power more quickly with distance as compared to far-field radiation power. In the transition zone between these regions, both near- and far-field effects influence field behavior.

The RFID tag 1006 and the RFID reader 1010 can be configured as "hybrid devices", for example, to utilize both far-field RFID and near-field RFID technologies. In an example embodiment, the switch 1008 is configured in conjunction with a user input mechanism (e.g., a button on the steering column or dash of the vehicle, a touch screen, or a voice recognition device) to allow a driver and/or passenger to select an account that is to be charged or debited in connection with a transaction involving a vehicle. For example, a primary or default account (e.g., a corporate or business account associated with the vehicle) is charged, unless an input is provided via the switch 1008 to designate an alternative account. In an example embodiment, an alternative account (such as a personal account, a new account, or an account not previously associated with transactions involving the vehicle) is recognized in real time, or "on-the-fly", by reading additional information from the RFID tag 1006 and/ or from another tag, such as a near-field communication (NFC) device located in or on the vehicle, or carried by a person (e.g., the driver of the vehicle).

In various example embodiments, one or both of the electronic devices 1000 and 1001 is configured to read a NFC device (e.g., which operates at 13.56 MHz on ISO/IEC 18000-3 air interface and at rates ranging from 106 kbit/s to 848 kbit/s and typically requires a distance of 4 cm or less between the NFC tag and reader). For example, the RFID reader 1010 (e.g., a NFC device located at an entrance/exit of a parking garage, or implemented in the form of a NFC-enabled handset, mobile telephone, or PCD) is utilized to read credit card and/or account information stored on another NFC device (e.g., a NFC tag, or a NFC-enabled electronic device, such as a smartphone running Google Wallet or another NFC-based application). In another example embodiment, the RFID tag 1006 includes or is operatively connected to a NFC reader device or an NFC-enabled handset, mobile telephone, or PCD, which is utilized to read the credit card and/or account information. In this example, the electronic device 1000, and/or a communications device operatively connected thereto, transmits or otherwise provides the credit card and/or account information to the electronic device 1001 and/or a processing center.

Additional examples of operating modes include, but are not limited to, a "disabled mode", a "passive mode", an "active mode", a "far-field mode", a "near-field mode", and various combinations thereof. By way of example, in the "disabled mode", the electronic device is prevented from transmitting signals. For example, if a vehicle is being towed or transported along a route that includes a toll road, the driver of the tow truck or transport vehicle can temporarily disable the electronic device equipped to the vehicle. In the "passive mode", an electronic device that is capable of functioning, for example, as either an active device or a passive device is reconfigured such that it operates as a passive device. In the "active mode", an electronic device that is capable of functioning, for example, as either an active device or a passive device is reconfigured such that it operates as an active device. The afore-described selectability between modes of operation that differ in their power requirements allows a driver, for example, to "boost" the signal level in environments or conditions that make reception difficult. In another example, the operator of a vessel transporting multiple vehicles equipped with electronic devices as described herein can temporarily activate (e.g., via wireless transmission of commands) the electronic devices to establish start times associated with the respective transactions of transporting each of the vehicles. In the far-field mode", an electronic device that is capable of functioning, for example, as either a far-field device or a near-field device is reconfigured such that it operates as a far-field device. In the "near-field mode", an electronic device that is capable of functioning, for example, as either a far-field device or a near-field device is reconfigured such that it operates as a near-field device. The afore-described selectability between modes of operation that differ in their range and/or utilize different electronic devices (e.g., of the apparatus) allows a driver, for example, to turn off the far field device after exiting a toll road and subsequently use a near-field device (e.g., the driver's NFC-enabled smartphone) to establish a start time when entering a parking structure.

Additional examples of operating modes involve migrating and/or sharing a process of generating, transmitting, and/or reading code (e.g., code identifying the vehicle). In an example "auxiliary device" mode, the electronic device (e.g., the electronic device 1000 and/or the electronic device 1001) communicates, for example, with an auxiliary device and provides the auxiliary device with information and/or data such as code identifying the vehicle. The auxiliary device, in turn, utilizes the information and/or data to generate or transmit the code. In example embodiments, the auxiliary device is, includes, or is provided via a NFC-enabled electronic device, such as a smartphone or PCD (e.g., of the driver or a passenger in the vehicle) that is configured with and/or provided with access to a NFC-based application (such as Google Wallet). In an example "auxiliary device" mode, the auxiliary device is provided with code identifying the vehicle and utilizes a NFC-based application to generate the code in response to the auxiliary device being positioned sufficiently close to a NFC code reader device (e.g., at an entrance or exit of a parking facility). In an example embodiment, the code is provided on a temporary basis, for example, the information and/or data includes instructions to the NFC-based application limiting the amount of time that the driver has to establish a start or stop time for a parking transaction involving the vehicle. Moreover, in an example embodiment, the information and/or data provides that the code automatically expires and/or is permanently deleted from the auxiliary device within an amount of time (e.g., a time limit) after the auxiliary device is provided with the code and authorized to use it in relation to a transaction involving the vehicle. In another example "auxiliary device" mode, the electronic device (e.g., the electronic device 1000 and/or the electronic device 1001) communicates indirectly with the auxiliary device (e.g., via one or more of the network 906 and the processing center 910). In another example "auxiliary device" mode, a source or device other than the electronic devices 1000 and 1001 (e.g., the processing center 910) communicates with the auxiliary device (e.g., a NFC-enabled smartphone) to provides the auxiliary device with the information and/or data (e.g., including and/or providing access to code identifying the vehicle).

In example embodiments, the electronic device 1001 includes multiple reader devices. In the case of a transportation infrastructure (e.g., a toll road), reader devices are located, for example, at the entrances and exits of the transportation infrastructure and/or provided in the form of hand-held reader devices that can be used by operators, employees, or service or other personnel of the transportation infrastructure (e.g., toll both attendants). In the case of a parking facility (e.g., a parking garage or parking lot), reader devices are located, for example, at the entrance(s) and exit(s) of the parking facility/lot and/or provided in the form of hand-held reader devices that can be used by operators, employees, or service or other personnel of the parking facility/lot (e.g., parking facility/lot attendants). In the case of a storage facility (e.g., a self storage facility), reader devices are located, for example, at entrance(s) and exit(s) of the storage facility and/or provided in the form of hand-held reader devices that can be used by operators, employees, or service or other personnel of the storage facility (e.g., storage facility attendants). In the case of an impound facility or lot (e.g., a police impound lot), reader devices are located, for example, at the entrance(s) and exit(s) of the impound facility or lot and/or provided in the form of hand-held reader devices that can be used by operators, employees, or service or other personnel of the impound facility or lot (e.g., impound facility/lot attendants). In the case of a vehicle transport vehicle (e.g., automobile transport vehicles), reader devices are located, for example, at the RO/RO entrance(s) and exit(s) of the vehicle transport vehicle and/or provided in the form of hand-held reader devices that can be used by vehicle transportation service personnel and/or the driver of the vehicle transport vehicle. In the case of a ship or other vehicle transport vessel or watercraft (e.g., cargo ship or freighter), reader devices are located, for example, at the RO/RO entrance(s) and exit(s) of the vehicle transport vehicle and/or provided in the form of hand-held reader devices that can be used by vehicle transportation service personnel and/or the crew of the ship or other vehicle transport vessel or watercraft. In the case of an airplane or other vehicle transport aircraft (e.g., cargo aircraft), reader devices are located, for example, at the RO/RO entrance(s) and exit(s) of the airplane or other vehicle transport aircraft and/or provided in the form of hand-held reader devices that can be used by vehicle transportation service personnel and/or the crew of the airplane or other vehicle transport aircraft.

In an example technology and/or methodology, a transaction start time is established (e.g., automatically established) by a reader device located at an entrance, a transaction stop time is established (e.g., automatically established) by a reader device located at an exit, and payment for the transaction (e.g., a transfer of funds determined in consideration of an amount of time passing from the start time to the stop time) is automatically deducted from an account (e.g., a credit card) associated with the transaction and/or the vehicle. Thus, the technologies and/or methodologies described herein stand to potentially eliminate prior inconveniences, such as having to stop to pay a toll road attendant or having to rush back to a parking garage prior to a time when the attendant is scheduled to leave (perhaps thereby imprisoning all vehicles in the garage until the next morning).

In example embodiments, the electronic device 1000 can operate in multiple operating modes simultaneously (e.g., utilizing multiple transponders). In example embodiments, the electronic device 1001 includes multiple reader devices (e.g., a far-field device and a near-field device).

In an example embodiment, the signals are generated or transmitted over an interval of time (e.g., whenever the motor of the vehicle is running and/or depending upon a position, state, or output of a switch or other inputs and/or commands). By way of example, the interval of time is associated with a transaction involving the vehicle and one or more of: a transportation infrastructure (e.g., a toll road), a parking facility or space (e.g., a parking garage), a storage facility or space (e.g., a self storage facility or space), an impound facility or lot (e.g., a police impound lot), a vehicle transport vehicle (e.g., automobile transport vehicles via "Roll On/Roll Off" (RO/RO)), a ship or other vehicle transport vessel or watercraft (e.g., cargo ship or freighter via RO/RO), and an airplane or other vehicle transport aircraft (e.g., cargo aircraft via RO/RO).

In an example embodiment, one or more of the signals establish a start time and/or a stop time associated with the transaction. In an example embodiment, the transaction includes charging an account (e.g., automatically charging an account) depending upon an amount of time passing between a start time and a stop time associated with the transaction.

In example systems, apparatuses, and methods described herein, one or more inputs and/or parameters for a transaction involving a vehicle are accessed, obtained, or established utilizing a signal and/or information that identifies or uniquely identifies the vehicle. By way of example, the transaction involves usage or utilization by the vehicle of, and/or custody or transportation of the vehicle by, one or more of: a transportation infrastructure (e.g., a toll road), a parking facility or space (e.g., a parking garage), a storage facility or space (e.g., a self storage facility or space), an impound facility or lot (e.g., a police impound lot), a vehicle transport vehicle (e.g., automobile transport vehicles via "Roll On/Roll Off" (RO/RO)), a ship or other vehicle transport vessel or watercraft (e.g., cargo ship or freighter via RO/RO), and an airplane or other vehicle transport aircraft (e.g., cargo aircraft via RO/RO). In example embodiments, the transaction includes charging an account associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle to one or more other accounts.

In an example embodiment, an apparatus for monitoring, managing, and facilitating transactions involving a vehicle includes: an electronic device that transmits or generates signals including or in association with vehicle identification information that identifies (e.g., uniquely identifies) a vehicle equipped with the device, the signals including or providing, or facilitating or initiating a process of providing access to, one or more inputs and/or parameters for a transaction involving the vehicle (or information relating to such a transaction). In various example embodiments, the electronic device includes one or more transponders, transceivers, transmitters, receivers, ID tags, ID readers, code readers, code generators, RFID devices, NFC devices, or a combination thereof. In an example embodiment, the signals include vehicle identification information (e.g., the VIN of the vehicle). In an example embodiment, the signals include information relating to one or more of the vehicle equipped with the electronic device, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle.

Example implementations of the systems, apparatuses, and methods described herein involve generating or transmitting signals in association with a vehicle, the signals including, providing, or facilitating or initiating a process of providing one or more inputs for a transaction involving the vehicle. In another example embodiment, an apparatus for monitoring, managing, and facilitating transactions involving a vehicle includes: one or more electronic devices that facilitate providing information including one or more inputs and/or parameters for a transaction involving a vehicle, at least one of the inputs and/or parameters identifying the vehicle or being associated with or established in association with the vehicle, the one or more electronic devices including at least one device configured to initiate, request, and/or facilitate a transfer or charge from an account in relation to the transaction. In an example embodiment, the one or more electronic devices are selectively controllable for generating or transmitting the signals in multiple different operating modes.

In example embodiments, at least one of the inputs and/or parameters is established utilizing a code (e.g., data encoded on the RFID tag 1006). In example embodiments, the code includes information that uniquely identifies the vehicle. In example embodiments, the one or more electronic devices (e.g., the electronic device 1000 and/or the electronic device 1001) are configured to generate, transmit, and/or read the code. In example embodiments, the electronic device 1000 is configured (e.g., including one or more electronic devices) to generate, transmit, and/or read the code. In example embodiments, the electronic device 1001 is configured (e.g., including one or more electronic devices) to generate, transmit, and/or read the code.

In example embodiments, the inputs and/or parameters include a start time, a stop time, and an association between the vehicle and the transaction, and the one or more electronic devices (e.g., the electronic device 1000 and/or the electronic device 1001) are configured to establish one or more of the start time, the stop time, and the association. In example embodiments, the inputs and/or parameters (for the transaction involving a vehicle) include information and/or data pertaining to a circumstance, such as previously described herein, that satisfies (predetermined or other) criteria. For example, an amount charged for the transaction of driving on a toll road can be determined (e.g., amount per mile driven is adjusted) in consideration of one or more of: the time of day that the driving was done (e.g., whether during "rush hour" or "off peak" travel times) and a status of the driver (e.g., whether the driver is of a "preferred" or "special" status, such as an "experienced driver" or a "safe driver" as determined for example from DMV and/or insurance data, a veteran of a foreign war, a person with no criminal record, a diplomat, a visitor, or a designated guest of the transportation infrastructure and/or the state).

In example embodiments, the one or more electronic devices are configured to initiate, request, or facilitate a process of providing one or more communications. For example, the one or more communications are from a device that generates the signals, a device that receives the signals, and/or a remote processing location or center. The one or more communications can include a resource or other information that provides access to a receipt or other documentation or information relating to the transaction and/or usage or utilization by the vehicle of, and/or custody or transportation of the vehicle by, one or more of, for example: a transportation infrastructure, a parking facility or space, a storage facility or space, an impound facility or lot, a vehicle transport vehicle, a ship or other vehicle transport vessel or watercraft, and an airplane or other vehicle transport aircraft. In example embodiments, the one or more communications initiate, request, or facilitate a process of providing a resource or other information at a mobile telephone, a smartphone, or a PCD.

In an example embodiment, the one or more electronic devices include an interactive user interface, a graphical user interface, or display configured to provide a visual representation of one or more of, for example: an acknowledgement that a start time, a stop time, and/or an association between the vehicle and the transaction has been established, a prompt or request for additional information or user inputs (e.g., to associate a new/different/valid account with the transaction and/or vehicle, to authorize a transfer of funds in relation to the transaction), information and/or instructions (e.g., toll road rates, available credit for an account associated with the transaction, how to configure the electronic device for different modes of operation), a notification (e.g., a message notifying a person that a required input for the transaction has not been provided, failed to establish, and/or appears to be invalid or corrupted), and a warning (e.g., a text message, such as: "The account currently associated with this transaction has insufficient funds available. Please ensure that charges for your transaction are promptly paid and/or arrange for additional funds to be added to your account to avoid overdraft fees and other penalties."). In an example embodiment, if the account to be charged lacks sufficient funds to pay for the transaction, a computer (or processing center of the like) can be programmed to automatically initiate a process of transmitting a bill or invoice, by e-mail and/or mail, to the registered owner. An account associated with a vehicle can also be associated with a vehicle registration process or procedure. Thus, in an example transaction, funds owed to a Department of Motor Vehicles or a state, for example, can be automatically transferred from the account (e.g., when payment for a registration renewal is not timely made or remains outstanding).

In an example embodiment, the one or more electronic devices are configured to access, or to initiate, request, or facilitate a process of providing access to, supplemental information identifying and/or in relation to a vehicle, person, entity and/or object associated with the account or with the transaction. In an example embodiment, the one or more electronic devices are configured to provide or facilitate access to the supplemental information, information associated with the transaction, and/or notifications relating to said information by one or more of, for example: an owner or operator of, or an authorized person or entity associated with, a transportation infrastructure, a parking facility or space, a storage facility or space, an impound facility or lot, a vehicle transport vehicle, a ship or other vehicle transport vessel or watercraft, and/or an airplane or other vehicle transport aircraft, a maintenance or service company, authorized operators and users of a system for monitoring and managing transportation infrastructure and locations of vehicles therein, a law enforcement agency, a parking enforcement agency, a government agency, a company or other private-sector entity or organization, a lienholder, a person or entity authorized or approved to repossess the vehicle, an insurance company, authorized or approved individuals or groups, an owner or a registered owner of the vehicle, and a person or persons authorized or approved by the owner and/or the registered owner of the vehicle.

In example embodiments, the processing center 910 and/or other participatory elements of a monitoring system receive or are provided with the signals and/or information (e.g., signals and/or information received over an interval of time). In example embodiments, the processing center 910 and/or other participatory elements of a monitoring system store the signals and/or information, utilize the signals and/or information to update one or more databases, and/or process the signals and/or information.

In an example embodiment, the electronic device 1000 is configured to receive and respond to interrupts and/or commands from one or more of, for example: authorized or approved sources and/or devices (e.g., law enforcement agencies, police and other authorized transmitter devices, blood alcohol sensors, one or more departments of motor vehicles, parking and/or traffic enforcement agencies, operators and users of a system for monitoring and managing transportation infrastructure and locations of vehicles therein, a person or an entity authorized or approved to receive or collect funds, an owner or a registered owner of the vehicle, a person or persons authorized or approved by the owner and/or the registered owner of the vehicle, lienholders, insurance companies, a processor or controller of or in communication with the electronic device 1000), biometric data acquisition devices, user-input mechanisms (e.g., on-board touch screen, mobile telephone, smartphone, or personal communication device (PCD) of the registered owner of the vehicle, emergency call devices), RFID devices (e.g., RFID transmitters and/or transponders), NFC devices, speed camera transmitters, and parking meters.

In example embodiments, the interrupts and/or commands facilitate, control, or initiate (e.g., in response to commands or instructions executed by the RFID tag 1006 and/or by a processor/controller accessible to and/or in communication with the electronic device 1000) one or more of, for example: modifying the information transmitted or adding additional information to the signals transmitted by the electronic device; providing information and/or notifications to authorized operators and users of a system for monitoring and managing transportation infrastructure and locations of vehicles therein; controlling an interactive user interface, a graphical user interface, or a display inside the vehicle, on a mobile communications device (e.g., a mobile telephone, a smartphone, or other PCD configured to facilitate wireless communications), and/or at a remote location to provide one or more of information, instructions, a notification, a warning, and a prompt; transferring funds from an account associated with one or more of the vehicle, an owner, a driver, a custodian, or a passenger of the vehicle, a person, an animal, an object within, secured to, or transported by the vehicle, and a person, an entity, an object, a status, a condition, an event, an indication, or an interrupt associated with the vehicle to one or more other accounts; and issuing a ticket, a citation, a bill, an invoice, a warning or other communication.

The authorized operators and users include one or more of, for example: an owner or operator of, or an authorized person or entity associated with, a transportation infrastructure (e.g., a toll road), a parking facility or space (e.g., a parking garage), a storage facility or space (e.g., a self storage facility or space), an impound facility or lot (e.g., a police impound lot), a vehicle transport vehicle (e.g., automobile transport vehicles via "Roll On/Roll Off" (RO/RO)), a ship or other vehicle transport vessel or watercraft (e.g., cargo ship or freighter via RO/RO), and/or an airplane or other vehicle transport aircraft (e.g., cargo aircraft via RO/RO), a law enforcement agency, a government agency (e.g., one or more departments of motor vehicles), a state, a county, a city, a town, or a municipality, a company or other private-sector entity or organization (e.g., a lienholder, an insurance company), an individual or a group (e.g., security guards/personnel, private investigators, deputized individuals, groups of citizens) provided with an authorized or approved device (e.g., proprietary equipment), an owner or a registered owner of the vehicle, and a person authorized or approved by the owner and/or the registered owner (e.g., family members, employees).

The one or more other accounts are associated with one or more of, for example: an owner or operator of, or an authorized person or entity associated with, a transportation infrastructure (e.g., a toll road), a parking facility or space (e.g., a parking garage), a storage facility or space (e.g., a self storage facility or space), an impound facility or lot (e.g., a police impound lot), a vehicle transport vehicle (e.g., automobile transport vehicles via "Roll On/Roll Off" (RO/RO)), a ship or other vehicle transport vessel or watercraft (e.g., cargo ship or freighter via RO/RO), and/or an airplane or other vehicle transport aircraft (e.g., cargo aircraft via RO/RO), an entity authorized or approved to receive or collect funds in relation to a parking or moving violation associated with the vehicle, a government agency, a state, a county, a city, a town, or a municipality, a court, a lienholder, and an insurance company.

The technologies and methods described herein can be implemented, by way of example, utilizing one or more websites, user interfaces, and/or applications. In an example embodiment, the processing center 910 can perform the functions of, provide, or facilitate a service host (e.g., implemented in the form of servers, processors, or the like operating under the control of software and/or other sources of commands or inputs) configured, for example, to utilize a system application or other platform to facilitate vehicle associated monitoring and/or other activities or tasks, for example, by hosting a website accessible by system participants and/or users via the network 906.

In example embodiments, technologies and methods for monitoring, managing, and facilitating transactions involving a vehicle are implemented via a website (and/or one or more other resources accessible via a network or otherwise).

In example embodiments, technologies and methods for monitoring, managing, and facilitating transactions involving a vehicle are implemented as an addition and/or an improvement to an existing website such as the official website of San Francisco FasTrak® (www.bayareafastrak.org) or E-ZPass® New York (www.e-zpassny.com). In an example embodiment, one or more interfaces are generated utilizing a custom plug-in system application which functions as an extension and overlay to an existing system application or other platform that facilitates, for example, on-line monitoring and managing of transactions involving vehicles and of accounts associated with said transactions. It should be understood that the user interfaces described herein can be implemented or provided utilizing a website, an addition and/or an improvement to an existing website, or a resource other than a website, and independent of whether the resource is directly accessible by the user. Furthermore, resources can be distributed with respect to their physical locations and can be controlled, individually or as groups (e.g., shared resources), by one or more service hosts and/or system participants.

In an example technology and/or methodology for monitoring, managing, and facilitating transactions involving a vehicle, each manufacturer of a motor vehicle is required, encouraged, and/or incentivized to install an electronic device that transmits or generates signals and/or information including vehicle identification information (e.g., the VIN of the vehicle) in response to an interrogation signal, for example, or when a field generated by an antenna associated with the electronic device electromagnetically couples with a field associated with another electronic device. For example, a DMV or other government agency can make the installation of a transmitter/transponder a requirement (e.g., a required step in the vehicle registration process) and mandatory in new vehicles as well as used vehicles.

Figure 11:
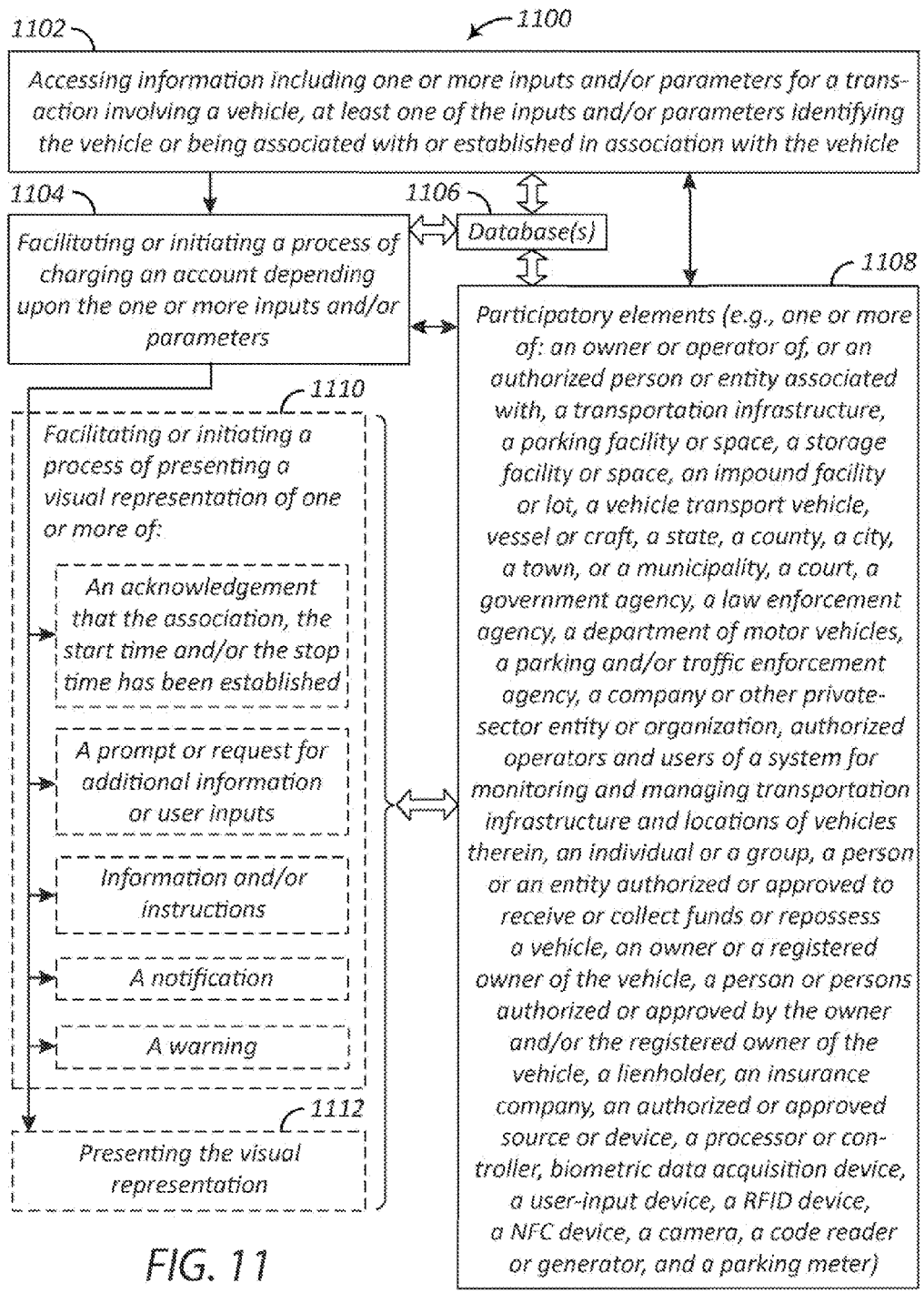
FIG. 11 shows an example implementation of a method for monitoring, managing, and facilitating transactions involving vehicles.

FIG. 11 shows an example implementation of a method 1100 for monitoring, managing, and facilitating transactions involving vehicles. At 1102, information is accessed, namely, information including one or more inputs and/or parameters for a transaction involving a vehicle, at least one of the inputs and/or parameters identifying the vehicle or being associated with or established in association with the vehicle.

In an example embodiment, the information includes vehicle identification information (e.g., a VIN or other information that uniquely identifies the vehicle). In an example embodiment, one or more of the inputs and/or parameters are established in association with the vehicle. In an example embodiment, the inputs and/or parameters include a start time, a stop time, and an association between the vehicle and the transaction. In an example embodiment, one or more of the vehicle identification information, the start time, the stop time, and the association (between the vehicle and the transaction) are accessed, obtained, or established from a process of reading a code (e.g., a code identifying or associated with the vehicle). In an example embodiment, the process of reading a code includes reading the code at two different times (e.g., establishing start and stop times associated with the transaction).

In example embodiments, signals transmitted or generated (e.g., by the electronic device 1000) are received (e.g., and referring also to FIGS. 1, 9, and 10, by one or more of, for example: a network, satellites, one or more processing centers, one or more system interfacing elements, one or more transponder/transceiver devices, one or more code reader devices, and one or more code generator devices. The signals can include information relating to (e.g., identifying) one or more of, for example: the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle. In an example embodiment, the signals are received over an interval of time.

At 1104, a process of charging an account depending upon the one or more inputs and/or parameters is facilitated or initiated. In an example embodiment, the signals and/or information, as previously discussed herein, can be processed to identify in association with the vehicle a circumstance that satisfies (predetermined or other) criteria. The signals and/or information are processed, for example, by one or more processing centers and/or one or more of the system interfacing elements (e.g., operators, users, and/or devices involved in or facilitating a system for monitoring and managing transportation infrastructure and locations of vehicles therein). In example embodiments, the signals and/or information are processed at least in part by participatory elements 1108. By way of example, the participatory elements 1108 include one or more of: an owner or operator of, or an authorized person or entity associated with, a transportation infrastructure, a parking facility or space, a storage facility or space, an impound facility or lot, a vehicle transport vehicle, a ship or other vehicle transport vessel or watercraft, and/or an airplane or other vehicle transport aircraft, a state, a county, a city, a town, or a municipality, a court, a government agency, a law enforcement agency, a department of motor vehicles, a parking and/or traffic enforcement agency, a company or other private-sector entity or organization, authorized operators and users of a system for monitoring and managing transportation infrastructure and locations of vehicles therein, an individual or a group provided with one or more authorized or approved devices, the use of which results in input(s) being provided, a person or an entity authorized or approved to receive or collect funds in relation to a parking or moving violation associated with the vehicle, an owner or a registered owner of the vehicle, a person or persons authorized or approved by the owner and/or the registered owner of the vehicle, a lienholder, a person or entity authorized or approved to repossess the vehicle, an insurance company, an authorized or approved source or device, a processor or controller, biometric data acquisition device, a user-input mechanism, a RFID device, a NFC device, a camera, a code reader or generator, and a parking meter. In example embodiments, information, data, and/or programs stored in one or more database(s) 1106 is utilized in processing the signals and/or information. The database(s) 1106 include one or more of, for example, a law enforcement database, a DMV database, an insurance database, a lienholder database, a transportation infrastructure database, a parking facility database, a storage facility database, an impound facility database, and a vehicle transport service database. It should be understood that the database(s) 1106 can include additional database(s) pertaining, for example, to other types of information and/or data as described herein.

Example methodologies and technologies described herein present, or facilitate a presentation of, visual representations pertaining to a vehicle, a circumstance, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle, information, and/or notifications. Example implementations utilize a network and/or communications links and one or more interfaces and/or displays are to present the visual representations. The circumstances include, by way of example, one of more of the previously discussed circumstances, the discussion of which is incorporated herein by reference.

At 1110, an action or a process is facilitated, controlled, or initiated (e.g., by one or more of the participatory elements 1108). The action or process involves presenting a visual representation of one or more of, for example: an acknowledgement that a start time, a stop time, and/or an association between the vehicle and the transaction has been established, a prompt or request for additional information or user inputs (e.g., to associate a new/different/valid account with the transaction and/or vehicle, to authorize a transfer of funds in relation to the transaction), information and/or instructions (e.g., toll road rates, available credit for an account associated with the transaction, how to configure the electronic device for different modes of operation), a notification (e.g., a message notifying a person that a required input for the transaction has not been provided, failed to establish, and/or appears to be invalid or corrupted), and a warning (e.g., a text message, such as: "The account currently associated with this transaction has insufficient funds available. Please ensure that charges for your transaction are promptly paid and/or arrange for additional funds to be added to your account to avoid overdraft fees and other penalties."). In an example embodiment, if the account to be charged lacks sufficient funds to pay for the transaction, a computer (or processing center of the like) can be programmed to automatically initiate a process of transmitting a bill or invoice, for example, by e-mail and/or mail, to the registered owner. In an example embodiment, the process can also include processing the signals and/or the information to identify in association with the transaction and/or the vehicle a circumstance that satisfies criteria for facilitating, controlling, or initiating an action or a process involving one or more of providing information, providing a notification, transferring funds, and issuing a ticket, a citation, a bill, an invoice, a warning, or other communication.

At 1112, a visual representation is presented (e.g., to one or more of the participatory elements 1108). The visual representation is presented at one or more of, for example: a mobile telephone, a smartphone, or a PCD, a device that generates, transmits, or reads code identifying the vehicle, a device, interface, or display that is separate from a device that generates, transmits, or reads code identifying the vehicle (e.g., a workstation, interface, vending machine, or kiosk), and a device, interface, or display that is remotely located in relation to a device that generates, transmits, or reads code identifying the vehicle (e.g., a processing/monitoring center, facility, or station).

An example method for monitoring, managing, and facilitating transactions involving a vehicle further includes providing, facilitating, or initiating a communication that includes a resource (e.g., URL) or other information that provides access to a receipt (e.g., PDF file/image) or other documentation or information relating to a charge to the account and/or usage or utilization by the vehicle of, and/or custody or transportation of the vehicle by, one or more of, for example: a transportation infrastructure, a parking facility or space, a storage facility or space, an impound facility or lot, a vehicle transport vehicle, a ship or other vehicle transport vessel or watercraft, and an airplane or other vehicle transport aircraft.

An example method for monitoring, managing, and facilitating transactions involving a vehicle further includes accessing, or facilitating or initiating a process of providing access to, supplemental information pertaining to one or more of a vehicle, a person, an entity, and an object associated with the account or with the transaction. In an example embodiment, the method for monitoring, managing, and facilitating transactions involving a vehicle further includes accessing, or facilitating or initiating a process of providing access to, the supplemental information, information associated with the transaction, and/or notifications relating to said information by one or more of, for example: an owner or operator of, or an authorized person or entity associated with, a transportation infrastructure, a parking facility or space, a storage facility or space, an impound facility or lot, a vehicle transport vehicle, a ship or other vehicle transport vessel or watercraft, and/or an airplane or other vehicle transport aircraft, a maintenance or service company, authorized operators and users of a system for monitoring and managing transportation infrastructure and locations of vehicles therein, a law enforcement agency, a parking enforcement agency, a government agency, a company or other private-sector entity or organization, a lienholder, a person or entity authorized or approved to repossess the vehicle, an insurance company, authorized or approved individuals or groups, an owner or a registered owner of the vehicle, and a person or persons authorized or approved by the owner and/or the registered owner of the vehicle.

Example implementations of the systems, apparatuses, and methods described herein involve generating, transmitting, and/or receiving signals in association with vehicle identification information, the signals including or providing, or facilitating or initiating a process of providing access to, information including one or more inputs and/or parameters for a transaction involving the vehicle. In another example embodiment, a method for monitoring, managing, and facilitating transactions involving a vehicle includes: receiving signals generated or transmitted by an electronic device, the signals being generated or transmitted in association with vehicle identification information that identifies a vehicle equipped with the device, the signals including or providing, or facilitating or initiating a process of providing access to, information including one or more inputs and/or parameters for a transaction involving the vehicle; and processing the signals and/or information to identify in association with the vehicle a circumstance that satisfies criteria for facilitating, controlling, or initiating an action or a process involving one or more of providing information, providing a notification, transferring funds, and issuing (e.g., electronically) a ticket, a citation, a bill, an invoice, a warning, or other communication. In example embodiments, the signals include vehicle identification information. The signals can also include information relating to one or more of, for example: the vehicle equipped with the electronic device, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle.

The transaction involves usage or utilization by the vehicle of, and/or custody or transportation of the vehicle by, one or more of, for example: a transportation infrastructure (e.g., a toll road), a parking facility or space (e.g., a parking garage), a storage facility or space (e.g., a self storage facility or space), an impound facility or lot (e.g., a police impound lot), a vehicle transport vehicle (e.g., automobile transport vehicles via "Roll On/Roll Off" (RO/RO)), a ship or other vehicle transport vessel or watercraft (e.g., cargo ship or freighter via RO/RO), and an airplane or other vehicle transport aircraft (e.g., cargo aircraft via RO/RO).

In an example method for monitoring, managing, and facilitating transactions involving a vehicle, the transaction includes charging an account associated with one or more of, for example: the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle to one or more other accounts.

In various example embodiments, the signals provide information relating to an interval of time (e.g., the signals include information pertaining to a start time and/or a stop time associated with the transaction). By way of example, the interval of time is associated with a transaction involving the vehicle and one or more of: a transportation infrastructure (e.g., a toll road), a parking facility or space (e.g., a parking garage), a storage facility or space (e.g., a self storage facility or space), an impound facility or lot (e.g., a police impound lot), a vehicle transport vehicle (e.g., automobile transport vehicles via "Roll On/Roll Off" (RO/RO)), a ship or other vehicle transport vessel or watercraft (e.g., cargo ship or freighter via RO/RO), and an airplane or other vehicle transport aircraft (e.g., cargo aircraft via RO/RO).

In an example method for monitoring, managing, and facilitating transactions involving a vehicle, the transaction includes charging an account depending upon an amount of time passing between start and stop times associated with the transaction.

In example embodiments, the method for monitoring, managing, and facilitating transactions involving a vehicle includes presenting a visual representation of one or more of, for example: the vehicle and/or the circumstance, information and/or instructions, a notification, a warning, and a prompt, as previously described herein. By way of example, the circumstance is an identification, a determination, and/or a prediction of one or more of a parking violation and a moving violation associated with one or more of the vehicle, an owner, a driver, a custodian, or a passenger of the vehicle, and a person within or transported by the vehicle. By way of example, the circumstance is an identification, a determination, and/or a prediction that one or more of a registration, a driver's license, and an insurance policy associated with one or more of the vehicle, an owner, a driver, a custodian, or a passenger of the vehicle, and a person within or transported by the vehicle is, or will be, expired, out-of-state, canceled, revoked, and/or suspended. By way of example, the circumstance is an identification, a determination, and/or a prediction that one or more of an account, a tax, an assessment, a charge, a surcharge, a fee, a fine, and a penalty associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle is, or will be, late, overdue, unpaid, delinquent, and/or in default. By way of example, the circumstance is a crime, reported, detected or suspected criminal activity, or an identification, a determination, and/or a prediction of a crime or criminal activity associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle. By way of example, the circumstance is an identification, a determination, and/or a prediction of a status associated with one or more of the vehicle, an owner, a driver, a custodian, or a passenger of the vehicle, a person, an animal, or an object within, secured to, or transported by the vehicle, and a person, an entity, an object, a condition, an event, an indication, or an interrupt associated with the vehicle. By way of example, the circumstance is an identification, a determination, and/or a prediction of one or more of a condition, an indication, and an interrupt associated with one or more of the vehicle, an owner, a driver, a custodian, or a passenger of the vehicle, a person, an animal, or an object within, secured to, or transported by the vehicle, a person, an entity, an object, a status, or an event associated with the vehicle, and a location, an area, a region, or an environment within which the vehicle is located, or that the vehicle is approaching or departing from. By way of example, the circumstance is an event for or during which a location of the vehicle or a person, an animal, or an object within, secured to, or transported by the vehicle presents or potentially raises a concern in relation to the event. By way of example, the circumstance is an identification, a determination, and/or a prediction that a location of the vehicle is within, approaching, or departing from an area, a region, or an environment designated as prohibited, unlicensed, limited, restricted, or cautionary access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle. By way of example, the circumstance is an identification, a determination, and/or a prediction that a location of the vehicle is outside, departing from, or returning to an area, a region, or an environment designated as allowed, permitted, licensed, unlimited, unrestricted, or safe access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle.

In example embodiments, the method for monitoring, managing, and facilitating transactions involving a vehicle includes providing information pertaining to one or more of the vehicle, an owner, a driver, a custodian, or a passenger of the vehicle, a person, an animal, or an object within, secured to, or transported by the vehicle, a person, an entity, an object, a status, a condition, an event, an indication, or an interrupt associated with the vehicle, the circumstance, and a location, an area, a region, or an environment within which the vehicle is located, or that the vehicle is approaching or departing from, to one of more of, for example: a law enforcement agency, a government agency, a state, a county, a city, a town, or a municipality, a company or other private-sector entity or organization, an individual or a group provided with an authorized or approved device, an owner or a registered owner of the vehicle, and a person authorized or approved by the owner and/or the registered owner.

In example embodiments of the method for monitoring, managing, and facilitating transactions involving a vehicle, the notification pertains to one or more of, for example: a parking violation and/or a moving violation associated with one or more of the vehicle, an owner, a driver, a custodian, or a passenger of the vehicle, and a person within or transported by the vehicle, a crime, criminal activity, illegal action, prohibited substance, criminal record or notice and/or conviction associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle, a location and/or a movement of the vehicle, locations and/or movements of one or more vehicles associated with a person, persons, entity, object, group, organization, event, enterprise, and/or circumstance, an event for or during which a location of the vehicle or a person, an animal, or an object within, secured to, or transported by the vehicle presents or potentially raises a concern in relation to the event, an area, a region, or an environment designated as prohibited, unlicensed, limited, restricted, or cautionary access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle, an area, a region, or an environment designated as allowed, permitted, licensed, unlimited, unrestricted, or safe access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle, a registration, a driver's license, and/or an insurance policy associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle, vehicle registration requirements for new residents of the state, and information and/or updates to information in a law enforcement database, a DMV database, an insurance database, and a lienholder database, a transportation infrastructure database, a parking facility database, a storage facility database, an impound facility database, and a vehicle transport service database, or other database.

In example embodiments, the method for monitoring, managing, and facilitating transactions involving a vehicle includes transferring funds from an account associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle to one or more other accounts. The one or more other accounts are associated with one or more of, for example: an owner or operator of, or an authorized person or entity associated with, a transportation infrastructure, a parking facility or space, a storage facility or space, an impound facility or lot, a vehicle transport vehicle, a ship or other vehicle transport vessel or watercraft, and/or an airplane or other vehicle transport aircraft, an entity authorized to receive or collect funds in relation to a parking or moving violation associated with the vehicle, a state agency, a city, a municipality, a court, a lienholder, and an insurance company.

In example embodiments, the method for monitoring, managing, and facilitating transactions involving a vehicle includes adding information pertaining to one or more of, for example: the vehicle, one or more transactions involving the vehicle, an owner, a driver, a custodian, or a passenger of the vehicle, a person, an animal, or an object within, secured to, or transported by the vehicle, a person, an entity, an object, a status, a condition, an event, an indication, or an interrupt associated with the vehicle, the circumstance, and a location, an area, a region, or an environment within which the vehicle is located, or that the vehicle is approaching or departing from, to a database and/or using the information to update a database.

In example embodiments, the method for monitoring, managing, and facilitating transactions involving a vehicle includes adding to or modifying the information, the circumstance, and/or the criteria in response to an input or inputs provided by one or more of, for example: an owner or operator of, or an authorized person or entity associated with, a transportation infrastructure, a parking facility or space, a storage facility or space, an impound facility or lot, a vehicle transport vehicle, a ship or other vehicle transport vessel or watercraft, and/or an airplane or other vehicle transport aircraft, a state, a county, a city, a town, or a municipality, a court, a government agency, a law enforcement agency, a department of motor vehicles, a parking and/or traffic enforcement agency, a company or other private-sector entity or organization, authorized operators and users of a system for monitoring and managing transportation infrastructure and locations of vehicles therein, an individual or a group provided with one or more authorized or approved devices, the use of which results in input(s) being provided, a person or an entity authorized or approved to receive or collect funds in relation to a parking or moving violation associated with the vehicle, an owner or a registered owner of the vehicle, a person or persons authorized or approved by the owner and/or the registered owner of the vehicle, a lienholder, a person or entity authorized or approved to repossess the vehicle, an insurance company, an authorized or approved source or device, a processor or controller, a biometric data acquisition device, a user-input mechanism, a RFID device, a NFC device, a camera, a code reader or generator, and a parking meter.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A method for monitoring, managing, and facilitating transactions involving a vehicle, the method comprising:
utilizing a process, shared between an electronic device and an auxiliary NFC-enabled electronic device, of generating signals including code identifying a vehicle equipped with the electronic device, one or more inputs and/or parameters for a transaction involving usage of a transportation infrastructure by the vehicle being established utilizing the auxiliary device in operative communication with one or more near-field communication (NFC) devices of the transportation infrastructure, the one or more inputs and/or parameters for said transaction including information and/or data pertaining to a determination that excessive levels of emissions or greenhouse gases are being generated by the vehicle, the auxiliary device utilizing the information and/or data to generate or transmit the code in association with said determination; and
facilitating or initiating a process of charging an account depending upon the one or more inputs and/or parameters for said transaction including the information and/or data pertaining to said determination.

2. The method of claim 1, wherein the electronic device includes a RFID device.

3. The method of claim 1, wherein the signals include information relating to or identifying a passenger of the vehicle.

4. The method of claim 1, wherein the transaction further involves usage or utilization by the vehicle of, and/or custody or transportation of the vehicle by, one or more of
a parking facility or space,
a storage facility or space,
an impound facility or lot,
a vehicle transport vehicle,
a ship or other vehicle transport vessel or watercraft, and
an airplane or other vehicle transport aircraft.

5. The method of claim 1, wherein the transaction includes charging an account associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle to one or more other accounts.

6. The method of claim 1, wherein said usage of a transportation infrastructure by a vehicle includes driving on a toll road.

7. The method of claim 1, further comprising:
utilizing an auxiliary device mode in which the electronic device communicates indirectly with the auxiliary device via one or more of a network and a processing center.

8. The method of claim 1, further comprising:
utilizing an auxiliary device mode in which a source or device other than the electronic device communicates with the auxiliary device to provide the auxiliary device with the information and/or data.

9. The method of claim 1, further comprising:
processing the signals to identify in association with the vehicle a circumstance that satisfies criteria for facilitating, controlling, or initiating an action or a process involving one or more of
providing information,
providing a notification,
transferring funds, and
issuing a ticket, a citation, a bill, an invoice, a warning, or other communication.

10. The method of claim 9, further comprising:
presenting a visual representation of one or more of
the vehicle and/or the circumstance,
information and/or instructions,
a notification,
a warning, and
a prompt.

11. The method of claim 9, wherein the circumstance is an identification, a determination, and/or a prediction of one or more of a parking violation and a moving violation associated with one or more of the vehicle, an owner, a driver, a custodian, or a passenger of the vehicle, and a person within or transported by the vehicle.

12. The method of claim 9, wherein the circumstance is an identification, a determination, and/or a prediction that one or more of a registration, a driver's license, and an insurance policy associated with one or more of the vehicle, an owner, a driver, a custodian, or a passenger of the vehicle, and a person within or transported by the vehicle is, or will be, expired, out-of-state, canceled, revoked, and/or suspended.

13. The method of claim 9, wherein the circumstance is an identification, a determination, and/or a prediction that one or more of an account, a tax, an assessment, a charge, a surcharge, a fee, a fine, and a penalty associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle is, or will be, late, overdue, unpaid, delinquent, and/or in default.

14. The method of claim 9, wherein the circumstance is a crime, reported, detected or suspected criminal activity, or an identification, a determination, and/or a prediction of a crime or criminal activity associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle.

15. The method of claim 9, wherein the circumstance is an identification, a determination, and/or a prediction of a status associated with one or more of the vehicle, an owner, a driver, a custodian, or a passenger of the vehicle, a person, an animal, or an object within, secured to, or transported by the vehicle, and a person, an entity, an object, a condition, an event, an indication, or an interrupt associated with the vehicle.

16. The method of claim 9, wherein the circumstance is an identification, a determination, and/or a prediction of one or more of a condition, an indication, and an interrupt associated with one or more of the vehicle, an owner, a driver, a custodian, or a passenger of the vehicle, a person, an animal, or an object within, secured to, or transported by the vehicle, a person, an entity, an object, a status, or an event associated with the vehicle, and a location, an area, a region, or an environment within which the vehicle is located, or that the vehicle is approaching or departing from.

17. The method of claim 9, wherein the circumstance is an event for or during which a location of the vehicle or a person, an animal, or an object within, secured to, or transported by the vehicle presents or potentially raises a concern in relation to the event.

18. The method of claim 9, wherein the circumstance is an identification, a determination, and/or a prediction that a location of the vehicle is within, approaching, or departing from an area, a region, or an environment designated as prohibited, unlicensed, limited, restricted, or cautionary access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle.

19. The method of claim 9, wherein the circumstance is an identification, a determination, and/or a prediction that a location of the vehicle is outside, departing from, or returning to an area, a region, or an environment designated as allowed, permitted, licensed, unlimited, unrestricted, or safe access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle.

20. The method of claim 9, wherein providing information includes
providing information pertaining to one or more of the vehicle, an owner, a driver, a custodian, or a passenger of the vehicle, a person, an animal, or an object within, secured to, or transported by the vehicle, a person, an entity, an object, a status, a condition, an event, an indication, or an interrupt associated with the vehicle, the circumstance, and a location, an area, a region, or an environment within which the vehicle is located, or that the vehicle is approaching or departing from, to one or more of
a law enforcement agency,
a government agency,
a state, a county, a city, a town, or a municipality,
a company or other private-sector entity or organization,
an individual or a group provided with an authorized or approved device,
an owner or a registered owner of the vehicle, and
a person authorized or approved by the owner and/or the registered owner.

21. The method of claim 9, wherein the notification pertains to one or more of
a parking violation and/or a moving violation associated with one or more of the vehicle, an owner, a driver, a custodian, or a passenger of the vehicle, and a person within or transported by the vehicle,
a crime, criminal activity, illegal action, prohibited substance, criminal record or notice and/or conviction associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle,
a location and/or a movement of the vehicle,
locations and/or movements of one or more vehicles associated with a person, persons, entity, object, group, organization, event, enterprise, and/or circumstance,
an event for or during which a location of the vehicle or a person, an animal, or an object within, secured to, or transported by the vehicle presents or potentially raises a concern in relation to the event,
an area, a region, or an environment designated as prohibited, unlicensed, limited, restricted, or cautionary access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle,
an area, a region, or an environment designated as allowed, permitted, licensed, unlimited, unrestricted, or safe access in relation to one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle,
a registration, a driver's license, and/or an insurance policy associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle,
vehicle registration requirements for new residents of the state, and
information and/or updates to information in a law enforcement database, a DMV database, an insurance database, and a lienholder database, a transportation infrastructure database, a parking facility database, a storage facility database, an impound facility database, and a vehicle transport service database, or other database.

22. The method of claim 9, wherein transferring funds includes
transferring funds from an account associated with one or more of the vehicle, an owner, a driver, a custodian, or a passenger of the vehicle, a person, an animal, or an object within, secured to, or transported by the vehicle, and a person, an entity, an object, a status, a condition, an event, an indication, or an interrupt associated with the vehicle to one or more other accounts.

23. The method of claim 22, wherein the one or more other accounts are associated with one or more of an owner or operator of, or an authorized person or entity associated with, a transportation infrastructure, a parking facility or space, a storage facility or space, an impound facility or lot, a vehicle transport vehicle, a ship or other vehicle transport vessel or watercraft, and/or an airplane or other vehicle transport aircraft, an entity authorized to receive or collect funds in relation to a parking or moving violation associated with the vehicle, a state agency, a city, a municipality, a court, a lienholder, and an insurance company.

24. The method of claim 9, wherein the ticket, citation, bill, invoice, warning, or other communication is electronically issued.

25. The method of claim 9, further comprising:
adding information pertaining to one or more of the vehicle, one or more transactions involving the vehicle, an owner, a driver, a custodian, or a passenger of the vehicle, a person, an animal, or an object within, secured to, or transported by the vehicle, a person, an entity, an object, a status, a condition, an event, an indication, or an interrupt associated with the vehicle, the circumstance, and a location, an area, a region, or an environment within which the vehicle is located, or that the vehicle is approaching or departing from, to a database and/or using the information to update a database.

26. The method of claim 9, further comprising:
adding to or modifying the information, the circumstance, and/or the criteria in response to an input or inputs provided by one or more of
an owner or operator of, or an authorized person or entity associated with, a transportation infrastructure, a parking facility or space, a storage facility or space, an impound facility or lot, a vehicle transport vehicle, a ship or other vehicle transport vessel or watercraft, and/or an airplane or other vehicle transport aircraft, a state, a county, a city, a town, or a municipality, a court, a government agency, a law enforcement agency, a department of motor vehicles, a parking and/or traffic enforcement agency, a company or other private-sector entity or organization, authorized operators and users of a system for monitoring and managing transportation infrastructure and locations of vehicles therein, an individual or a group provided with one or more authorized or approved devices, the use of which results in input(s) being provided, a person or an entity authorized or approved to receive or collect funds in relation to a parking or moving violation associated with the vehicle, an owner or a registered owner of the vehicle, a person or persons authorized or approved by the owner and/or the registered owner of the vehicle, a lienholder, a person or entity authorized or approved to repossess the vehicle, an insurance company, an authorized or approved source or device, a processor or controller, a biometric data acquisition device, a user-input mechanism, a RFID device, a NFC device, a camera, a code reader or generator, and a parking meter.

* * * * *